(12) United States Patent
Okazaki

(10) Patent No.: US 8,396,594 B2
(45) Date of Patent: Mar. 12, 2013

(54) ROBOT, CONTROL DEVICE FOR ROBOT, AND CONTROL METHOD OF ROBOT

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/241,579

(22) Filed: Sep. 23, 2011

(65) Prior Publication Data

US 2012/0010747 A1 Jan. 12, 2012

Related U.S. Application Data

(63) Continuation of application No. PCT/JP2010/006271, filed on Oct. 22, 2010.

(30) Foreign Application Priority Data

Jan. 4, 2010 (JP) .................................. 2010-000084

(51) Int. Cl.
*G05B 15/00* (2006.01)
*B25J 9/06* (2006.01)
*B25J 13/08* (2006.01)

(52) U.S. Cl. ........ 700/253; 700/258; 700/245; 700/254; 700/260; 700/261; 318/100; 318/568.16; 318/568.21; 901/9; 901/46

(58) Field of Classification Search .................. 700/250, 700/90, 245, 253, 257, 264, 258, 254, 260, 700/261; 318/568.12, 568.14, 568.2, 568.22, 318/568.16, 100, 568.21; 901/9, 46
See application file for complete search history.

(56) References Cited

U.S. PATENT DOCUMENTS

| 5,915,073 | A | * | 6/1999 | Maeda | 700/245 |
|---|---|---|---|---|---|
| 6,522,952 | B1 | | 2/2003 | Arai et al. | |
| 6,786,896 | B1 | * | 9/2004 | Madhani et al. | 606/1 |
| 7,313,463 | B2 | * | 12/2007 | Herr et al. | 700/245 |
| 7,415,321 | B2 | * | 8/2008 | Okazaki et al. | 700/245 |
| 7,443,115 | B2 | * | 10/2008 | Okamoto et al. | 318/100 |
| 7,558,647 | B2 | * | 7/2009 | Okazaki | 700/260 |

(Continued)

FOREIGN PATENT DOCUMENTS

| JP | 2000-343469 | 12/2000 |
|---|---|---|
| JP | 2005-14133 | 1/2005 |

(Continued)

OTHER PUBLICATIONS

International Search Report issued Feb. 22, 2011 in International (PCT) Application No. PCT/JP2010/006271.

(Continued)

*Primary Examiner* — Ronnie Mancho
(74) *Attorney, Agent, or Firm* — Wenderoth, Lind & Ponack, L.L.P.

(57) ABSTRACT

A robot is provided with a multi-joint robot arm, an external force detection unit that is installed in the arm, and detects an external force, a joint movable-state calculation unit that calculates a movable state of a joint of the arm, an external force conversion unit which, based on the movable state calculated by the joint movable-state calculation unit, converts the external force detected by the external force detection unit to a converted external force, and a control unit that controls the arm based on the converted external force so as to regulate the operation of the arm.

11 Claims, 12 Drawing Sheets

U.S. PATENT DOCUMENTS

| | | | |
|---|---|---|---|
| 7,606,634 B2 * | 10/2009 | Takenaka et al. | 700/260 |
| 7,747,351 B2 * | 6/2010 | Tsusaka et al. | 700/245 |
| 7,751,938 B2 * | 7/2010 | Tsusaka et al. | 700/250 |
| 8,024,071 B2 * | 9/2011 | Komatsu et al. | 700/258 |
| 8,112,179 B2 * | 2/2012 | Nakajima | 700/261 |
| 8,140,189 B2 * | 3/2012 | Nagasaka | 700/262 |
| 2003/0135303 A1 | 7/2003 | Arai et al. | |
| 2007/0112458 A1 | 5/2007 | Kondo et al. | |
| 2009/0105880 A1 * | 4/2009 | Okazaki | 700/258 |
| 2009/0171505 A1 * | 7/2009 | Okazaki | 700/258 |
| 2010/0087955 A1 * | 4/2010 | Tsusaka et al. | 700/245 |
| 2010/0301539 A1 | 12/2010 | Murayama | |
| 2011/0040411 A1 | 2/2011 | Murayama et al. | |

FOREIGN PATENT DOCUMENTS

| | | |
|---|---|---|
| JP | 2009-202280 | 9/2009 |
| JP | 2009-262271 | 11/2009 |

OTHER PUBLICATIONS

International Report on Patentability issued Aug. 23, 2012 in International Application No. PCT/JP2010/006271.

* cited by examiner

ROBOT, CONTROL DEVICE FOR ROBOT, AND CONTROL METHOD OF ROBOT

This is a continuation application of International Application No. PCT/JP2010/006271, filed Oct. 22, 2010.

BACKGROUND OF THE INVENTION

The present invention relates to a robot that carries out a cooperative job with a person, such as a robot equipped with a robot arm for use in executing a job assist such as a power assist in factories, household, or a nursing care field, a control device and a control method for such a robot.

In recent years, the robot of a person cooperation type that is cooperatively operated with a person in factories and the like so as to carry out a job assist, such as a power assist, has drawn public attentions. Since the robot of such a person cooperation type is allowed to work by a person's manipulation, it is applicable to a practical job without having highly autonomous functions, and since the robot is operated under control of the person, safety is highly ensured, and in the future, such a robot is highly expected to be applied not only to factories, but also to living assistance in household or the nursing care field.

On the other hand, different from a conventional robot that is operated as preliminarily programmed, the person cooperation-type robot might become unstable in control or might be broken down, because of a person that carries out such a manipulation as to exceed a preliminarily assumed range, such as exceeding an operable range due to the person's operation.

In order to solve these issues, an assist transporting device has been disclosed (Patent Document 1) as the conventional art in which a limiter for limiting an operable range is installed, and when the transported object exceeds the limiter, a predetermined repulsive force is transmitted to the operator.

PRIOR ART DOCUMENTS

Patent Documents

Patent Document 1: Japanese Unexamined Patent Publication No. 2005-14133

SUMMARY OF THE INVENTION

Issues to be Resolved by the Invention

In the above-mentioned conventional art, however, since this method provides a fixed limiter for regulating the work range of the hand of the robot arm, the application of this method becomes difficult, in a case where the movable range of the hand is changed in a complicated manner due to a relationship among a plurality of joints, such as regulated operation ranges among the respective joints of a robot arm.

Moreover, in the conventional art, with respect to an operation exceeding the limiter, by generating a repulsive force by changing a control parameter, such as a spring constant, the operation is regulated; however, the structure of the control system might become complicated in an attempt to make the control parameter variable. Furthermore, by changing the control parameter, the control system might become unstable, with the result that the action of the robot might become unstable.

The object of the present invention is to resolve the above-mentioned issues of the conventional control device, and subsequently to provide a robot that achieves an operation regulation of the robot arm in response to an operating state of each joint, such as a regulation of an operation range of each joint of the robot arm, by using a simple control system, so as to reduce instability of the control system, and a control device and a control method for such a robot.

Means for Resolving the Issues

In order to achieve the above objective, the present invention has the following structures.

In accordance with a first aspect of the present invention, there is provided a robot, which includes a multi-joint robot arm;

an external force detection means that is installed in the multi-joint robot arm, and detects an external force;

a joint movable-state calculation means that calculates a movable state of a joint of the multi-joint robot arm, the joint being located at any position within a movable range;

an external force conversion means which, based on the movable state of the joint calculated by the joint movable-state calculation means, converts the external force detected by the external force detection means to a converted external force from which a direction component in which the robot arm is made operable is extractable upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

In accordance with a ninth aspect of the present invention, there is provided a control device for a robot having a multi-joint robot arm, comprising:

a joint movable-state calculation means that calculates a movable state of a joint of the multi-joint robot arm, the joint being located at any position within a movable range;

an external force conversion means which, based on the movable state of the joint calculated by the joint movable-state calculation means, converts an external force detected by external forge detection means that is installed in the multi-joint robot arm so as to detect the external force to a converted external force from which a direction component in which the robot arm is made operable is extractable upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

In accordance with a tenth aspect of the present invention, there is provided a control method for a robot having a multi-joint robot arm, comprising:

allowing a joint movable-state calculation means to calculate a movable state of a joint of the multi-joint robot arm, the joint being located at any position within a movable range;

based on the calculated movable state of the joint, allowing an external force conversion means to convert an external force detected by an external force detection means that is installed in the multi-joint robot arm so as to detect the external force to a converted external force from which a direction component in which the robot arm is made operable is extractable upon application of the external force to the robot arm; and allowing a control means to control the multi-joint robot arm so as to be operation-regulated in accordance with the movable state of the joint of the multi-joint robot arm, by carrying out impedance control based on the converted external force.

In accordance with an eleventh aspect of the present invention, there is provided a control program for a robot having a multi-joint robot arm, allowing a computer to function as:

a joint movable-state calculation means to calculate a movable state of a joint of the multi-joint robot arm, the joint being located at any position within a movable range;

an external force conversion means which, based on the movable state of the joint calculated by the joint movable-state calculation means, converts an external force detected by an external force detection means that is installed in the multi-joint robot arm to detect the external force to a converted external force from which a direction component in which the robot arm is made operable is extractable upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

EFFECTS OF THE INVENTION

In accordance with the robot, the control device, and the control method for the robot of the present invention, the joint movable-state calculation means and the force conversion means are provided; therefore, even when a person carries out a manipulation that exceeds the movable range of the joint upon operation under an impedance controlling process, the joint movable-state calculation means determines whether or not the joint is located at any position within the movable range and is in a movable state, and by using the converted external force converted by the external force conversion means as input to the impedance calculation means, the operation regulation of the robot arm is made possible, thereby making it possible to prevent the joint from exceeding the movable range.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE EMBODIMENTS

Figure 1:
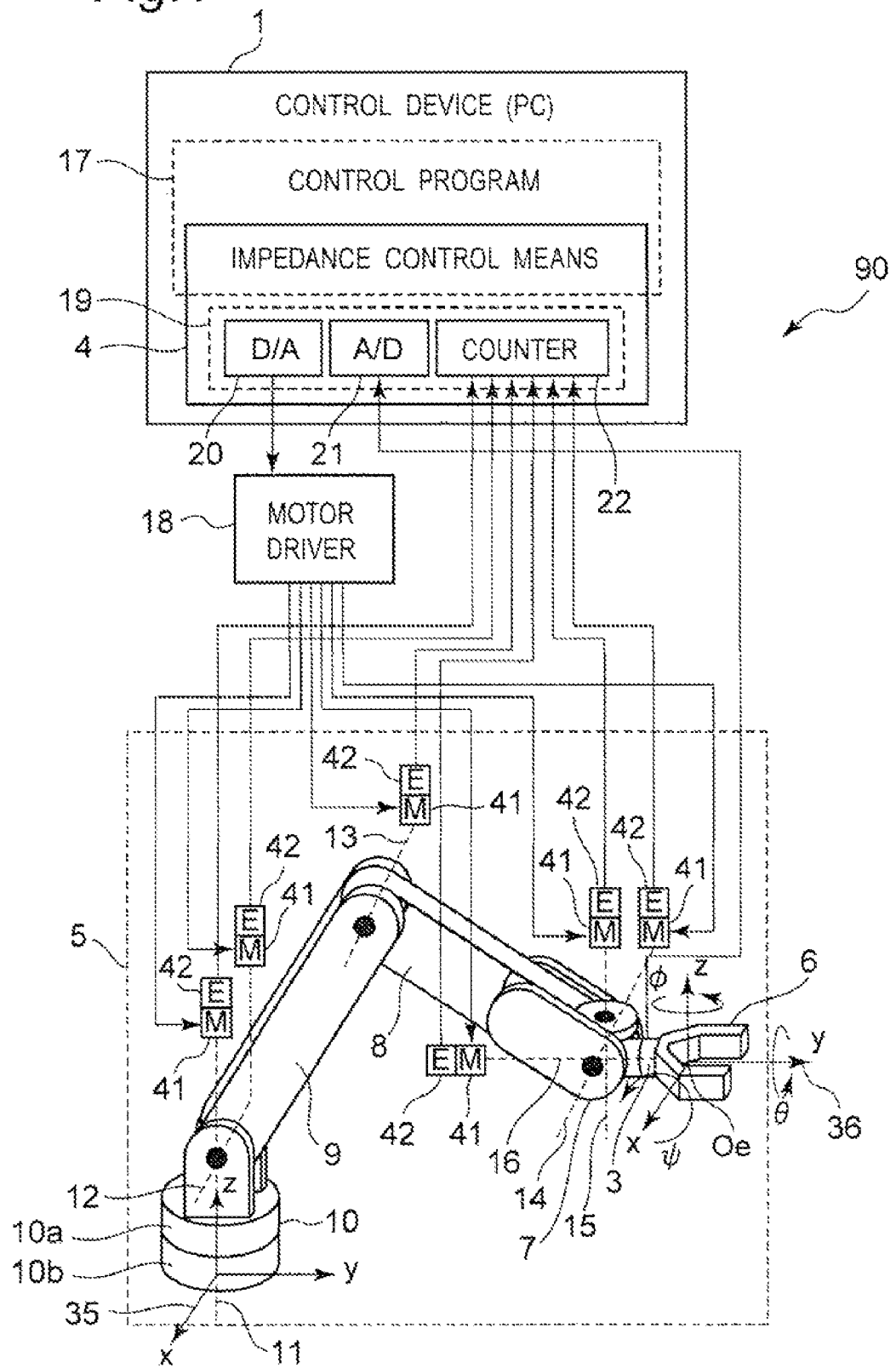
FIG. 1 is a view illustrating an entire structure of a robot in accordance with a first embodiment of the present invention.

Referring to the drawings, the following description will refer to embodiments of the present invention.

Prior to detailed descriptions of embodiments of the present invention by reference to drawings, the following description will refer to various aspects of the present invention.

According to a first aspect of the present invention, there is provided a robot comprising:

a multi-joint robot arm;

an external force detection means that is installed in the multi-joint robot arm, and detects an external force;

a joint movable-state calculation means that calculates a movable state of a joint of the multi-joint robot arm, the joint being located at any position within a movable range;

an external force conversion means which, based on the movable state of the joint calculated by the joint movable-state calculation means, converts the external force detected by the external force detection means to a converted external force from which a direction component in which the robot arm is made operable can be extracted upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

According to a second aspect of the present invention, there is provided the robot in accordance with the first aspect, wherein the external force conversion means converts the external force detected by the external force detection means as an orthogonal projection onto a tangential plane of a constraint curved surface in which a hand of the multi-joint robot arm is allowed to move, when the joint of the multi-joint robot arm is fixed.

According to a third aspect of the present invention, there is provided the robot in accordance with the first or second aspect, further comprising:

an external force torque calculation means that calculates an external force torque that is generated in each of joints by the external force applied to the multi-joint robot arm, wherein based on results of calculations of the external torque calculation means, the joint movable-state calculation means determines whether or not the external force torque is a force that tries to return an action of each joint of the multi-joint robot arm to an inside of the movable range from an outside of the movable region, and when the joint movable-state calculation means determines that the converted external force corresponds to the force that tries to return the action of each joint of the multi-joint robot arm to the inside of the movable range from the outside of the movable region, the control means refrains from regulating the operation, while on the other hand, when the joint movable-state calculation means determines that the external force torque does not correspond to the force that tries to return the action of each joint of the multi-joint robot arm to the inside of the movable range from the outside of the movable range, the control means regulates the operation.

According to a fourth aspect of the present invention, there is provided the robot in accordance with the first or second aspect, wherein, by converting the external force to a joint torque, the joint movable-state calculation means determines whether or not the converted external force converted to the joint torque corresponds to a force that tries to return an action of each joint of the multi-joint robot arm to an inside of the movable range from an outside of the movable range, and when the joint movable-state calculation means determines that the converted external force corresponds to the force that tries to return the action of each joint of the multi-joint robot arm to the inside of the movable range from the outside of the movable region, the control means refrains from regulating the operation, while on the other hand, when the joint movable-state calculation means determines that the converted external force does not correspond to the force that tries to return the action of each joint of the multi-joint robot arm to the inside of the movable range from the outside of the movable range, the control means regulates the operation.

According to a fifth aspect of the present invention, there is provided the robot in accordance with any one of first to fourth aspects, further comprising:

an operation mode setting unit that sets a movable or fixed operation mode for each of the joints of the multi-joint robot arm, and a joint operation mode setting means which, upon receipt of an instruction of the operation mode set by the operation mode setting unit, calculates the movable state based on the operation mode and the movable state of the joint calculated by the joint movable-state calculation means, wherein, based on the movable state of the joint calculated by the joint operation mode setting means, the external force conversion means converts the external force detected by the external force detection means to a converted external force from which a direction component in which the robot arm is made operable can be extracted upon application of the external force to the robot arm; and by carrying out impedance control based on the converted external force, the control means regulates the operation in accordance with the movable state of the joint of the multi-joint robot arm.

According to a sixth aspect of the present invention, there is provided the robot in accordance with the third or fourth aspect, the joint movable-state calculation means prepares buffer ranges, each located a fixed distance inside a border line of each of two ends of the movable range of the joint, and in the respective buffer ranges, gradually changes the movable state of the joint.

According to a seventh aspect, there is provided the robot in accordance with the first aspect, wherein buffer ranges, each located inside each of two ends of a movable range of the joint of the multi-joint robot arm, a perfectly movable range PMR corresponding to a rest of the movable range from which the buffer ranges are excluded, and a range outside the movable range are prepared in a divided manner, and the joint movable-state calculation means calculates values of the movable states of the joint so as to be different from one another depending on the respective ranges.

According to an eighth aspect, there is provided the robot in accordance with the first aspect, wherein the joint movable-state calculation means and the force conversion means are prepared separately from the control means of the multi-joint robot arm as second control means, and the external force converted by the force conversion means is inputted to the control means by the second control means through communication.

According to a ninth aspect of the present invention, there is provided a control device for a robot having a multi-joint robot arm, comprising:

a joint movable-state calculation means that calculates a movable state of a joint of the multi-joint robot arm, the joint being located at any position within a movable range;

an external force conversion means which, based on the movable state of the joint calculated by the joint movable-state calculation means, converts an external force detected by external force detection means that is installed in the multi-joint robot arm so as to detect the external force to a converted external force from which a direction component in which the robot arm is made operable can be extracted upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

According to a tenth aspect of the present invention, there is provided a control method for a robot having a multi-joint robot arm, comprising:

allowing a joint movable-state calculation means to calculate a movable state of a joint of the multi-joint robot arm, the joint being located at any position within a movable range;

based on the calculated movable state of the joint, allowing an external force conversion means to convert an external force detected by an external force detection means that is installed in the multi-joint robot arm so as to detect the external force to a converted external force from which a direction component in which the robot arm is made operable can be extracted upon application of the external force to the robot arm; and allowing a control means to control the multi-joint robot arm so as to be operation-regulated in accordance with the movable state of the joint of the multi-joint robot arm, by carrying out impedance control based on the converted external force.

According to an eleventh aspect of the present invention, there is provided a control program for a robot having a multi-joint robot arm, allowing a computer to function as:

a joint movable-state calculation means to calculate a movable state of a joint of the multi-joint robot arm, the joint being located at any position within a movable range;

an external force conversion means which, based on the movable state of the joint calculated by the joint movable-state calculation means, converts an external force detected by external force detection means that is installed in the multi-joint robot arm so as to detect an external force to a converted external force from which a direction component in which the robot arm is made operable can be extracted upon application of the external force to the robot arm; and a control means that controls the multi-joint robot arm so as to be operation-regulated in accordance with the movable state of the joint of the multi-joint robot arm, by carrying out impedance control based on the converted external force converted by the external force conversion means.

Referring to drawings, the following description will refer to embodiments of the present invention in detail.

(First Embodiment)

FIG. 1 is a view illustrating a structure of a robot 90 in accordance with a first embodiment of the present invention. This robot 90 is provided with a multi-joint robot arm 5 and a control device 1 that controls operations of the multi-joint robot arm 5.

The control device 1 is configured by a general-use personal computer in its hardware. Moreover, portions except for an input/output IF 19 of an impedance control means (impedance control unit) 4 are achieved as a software control program 17 to be executed by the personal computer.

The input/output IF 19 is constituted by a D/A board 20, an A/D board 21, and a counter board 22 connected to expansion throttles, such as PCI buses, of the personal computer.

The control program 17 for use in controlling operations of the multi-joint robot arm 5 of the robot 90 is executed so that the control device 1 is allowed to function. Pieces of joint-angle information, which are outputted from encoders 42 of the respective joints 11, 12, 13, 14, 15, and 16 of the robot arm 5, are acquired by the control device 1 through the counter board 22 so that control instruction values for use in rotation operations of the respective joints 11, 12, 13, 14, 15, and 16 are calculated by the control device 1. The calculated control instruction values are provided to a motor driver 18 through the D/A board 20 so that in accordance with the respective control instruction values sent from the motor driver 18, motors 41 of the respective joints 11, 12, 13, 14, 15, and 16 of the robot arm 5 are driven.

The robot arm 5 is a multi-link manipulator having 6 degrees of freedom, and is provided with a hand 6 functioning as one example of a tip unit, a fore-arm link 8 having a wrist unit 7 to which the hand 6 is attached, an upper arm link 9 to which the fore-arm link 8 is rotatably coupled, and a base portion 10 to which the upper-arm link 9 is rotatably coupled and supported. The wrist unit 7 has three rotation axes, that is, a fourth joint 14, a fifth joint 15, and a sixth joint 16, so that relative postures (orientations) of the hand 6 relating to the upper-arm link 9 can be changed. The other end of the fore-arm link 8 is allowed to rotate around the third joint 13 relative to one end of the upper-arm link 9, while the other end of the upper-arm link 9 is allowed to rotate around the second joint 12 relative to the base portion 10. Moreover, an upper movable unit 10a of the base portion is allowed to rotate around the first joint 11 relative to a lower fixed unit 10b of the base unit such that it is allowed to rotate around total six axes, thereby forming the above-mentioned multi-link manipulator having six degrees of freedom.

Each of the joints 11, 12, 13, 14, 15, and 16 forming rotation portions of the respective axes is provided with a rotation driving device (motor 41 in the present first embodiment) attached to one of members of each of the joints 11, 12, 13, 14, 15, and 16 and an encoder 42 used for detecting a rotation phase angle (that is, a joint angle) of the rotation shaft of the motor 41. Moreover, with the rotation shaft of the motor 41 coupled to the other member of the joint, the rotation shaft is forwardly/reversely rotated so that the other member is allowed to rotate around the shaft relative to the one of the members. The rotation driving device is driven and controlled by a motor driver 18, which will be described later. In the present first embodiment, the motor 41 serving as one example of the rotation driving device, and the encoder 42 are installed inside each of the joints 11, 12, 13, 14, 15, and 16 of the robot arm 5.

Reference symbol 35 represents the absolute coordinate system in which relative positional relationships to the lower fixed unit 10b of the base unit 10 are fixed, and 36 represents a hand coordinate system in which relative positional relationships to the hand 6 are fixed. The origin position $O_e$ (x, y, z) of the hand coordinate system 36, viewed from the absolute coordinate system 35, is defined as the hand position of the robot arm 5, and the orientation of the hand coordinate system 36, viewed from the absolute coordinate system 35, is represented by roll, pitch, and yaw angles ($\phi$, $\theta$, $\psi$), so as to be defined as the hand orientation of the robot arm 5, so that the hand position-orientation vector is defined by $r=[x, y, z, \phi, \theta,]^T$. In a case where the hand position-orientation of the robot arm 5 is controlled, the hand position-orientation vector r is made to follow a desired hand position-orientation vector $r_d$.

A force sensor 3, which functions as one example of external force detection means (external force detection unit or external force detection device), is installed between the wrist unit 7 and the hand 6 so that an external force imposed onto the hand 6 can be detected.

Figure 2:
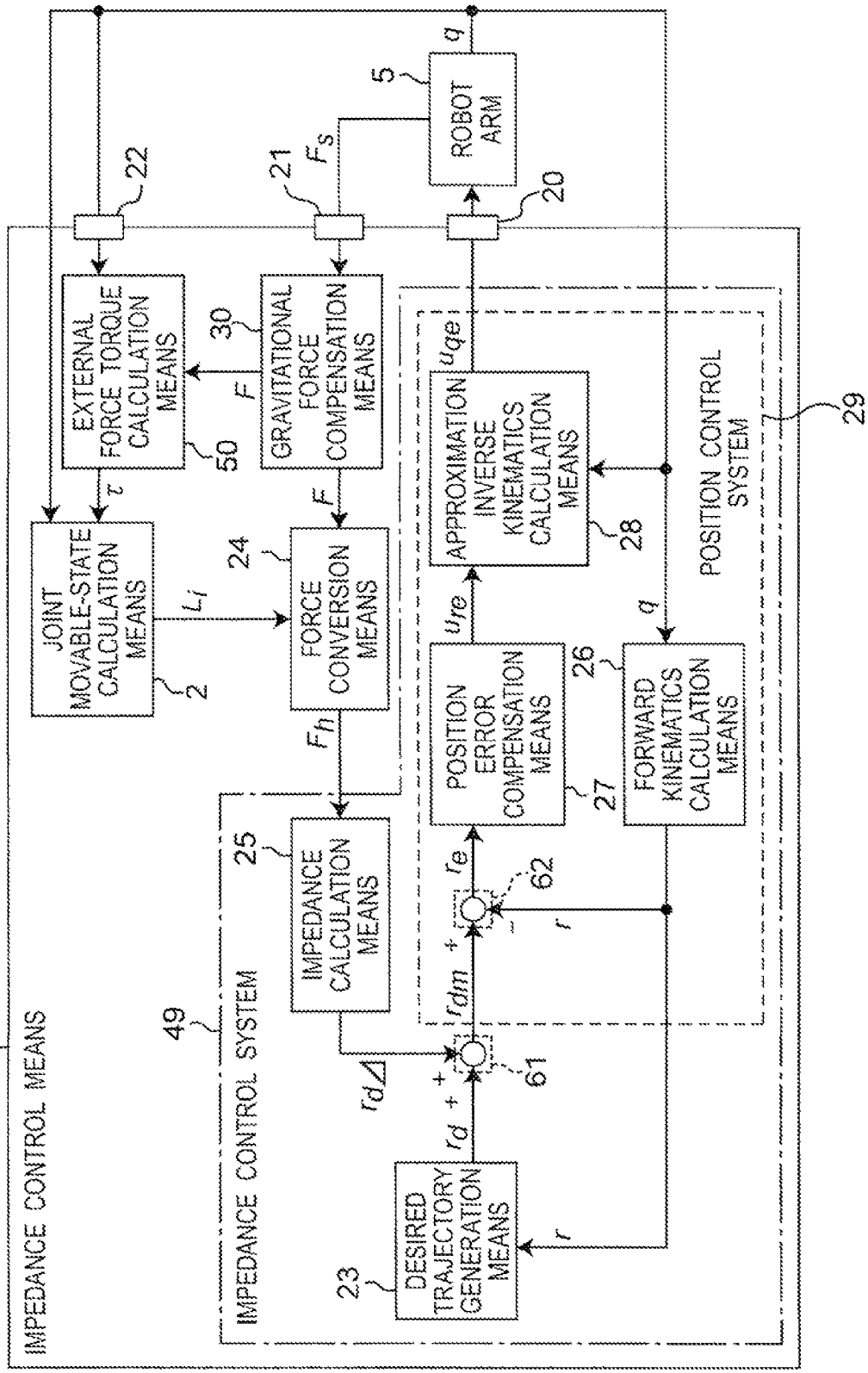
FIG. 2 is a block diagram illustrating a structure of an impedance control means of the robot in the first embodiment.

Next, referring to FIG. 2, the following description will refer to the impedance control means 4 in detail. In FIG. 2, reference symbol 5 represents a robot arm shown in FIG. 1. Current values of the joint angles, measured by the encoders 42 of the respective joint axes (joint angle vector) $q=[q_1, q_2, q_3, q_4, q_5, q_6]^T$, are outputted from the robot arm 5, and acquired by the impedance control means 4 through the counter board 22. In this case, $q_1$, $q_2$, $q_3$, $q_4$, $q_5$, and $q_6$ represent joint angles of the respective first joint, 11, second joint 12, third joint 13, fourth joint 14, fifth joint 15, and sixth joint 16.

Moreover, an external force $F_s=[f_x, f_y, f_z, n_x, n_y, n_z]^T$ measured by the force sensor 3 is outputted from the robot arm 5, and acquired into the impedance control means 4 by the A/D board 21.

Desired trajectory generation means (desired trajectory generation unit) 23 outputs a hand position-orientation desired vector $r_d$ used for achieving a desired operation of the robot arm 5. The desired operation of the robot arm 5 is preliminarily provided as time-sequential data representing positions of points ($r_{d0}$, $r_{d1}$, $r_{d2}$, ... ) in accordance with a desired job. The desired trajectory generation means 23 interpolates the trajectory between the respective points by using polynomial interpolation so that the hand position-orientation desired vector $r_d$ is generated.

Impedance calculation means (impedance calculation unit) 25 has a function for achieving mechanical impedance for the robot arm 5, and outputs 0 in a case where the robot arm 5 is independently operated by positional control so as to follow the desired trajectory generated by the desired trajectory generation means 23. On the other hand, in a case where the robot arm 5 and a person carry out a cooperative job, the impedance calculation means 25 calculates a hand position-orientation desired correction output $r_{d\Delta}$ used for achieving mechanical impedance for the robot arm 5 by using (i) preset impedance parameters M, D, and K (inertia M, viscosity D, and rigidity K) and a converted external force $F_h$ obtained by converting the external force F that is to be inputted to the impedance control means 4 (gravitational force compensation means 30 of the impedance control means 4), based on the following expression (1), and outputs the result. The hand position-orientation desired correction output $r_{d\Delta}$ is added to a hand position-orientation desired $r_d$ outputted from the desired trajectory generation means 23 by a first operation unit 61 so that a hand position-orientation correction desired vector $r_{dm}$ is generated.

[Equation 1]

$$r_{d\Delta}=(s^2M+sD+K)^{-1}F_h \quad (1)$$

wherein the following expressions are satisfied:

[Equation 2]

$$M = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad (2)$$

[Equation 3]

$$D = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad (3)$$

[Equation 4]

$$K = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix}, \quad (4)$$

with s serving as a Laplace operator.

A joint angle vector q corresponding to the current value q of each joint angle outputted from the robot arm 5 is inputted to forward kinematics calculation means 26. The forward kinematics calculation means 26 carries out geometrical calculations for converting the joint angle vector q of the robot arm 5 into a hand position-orientation vector r.

An error $r_e$ between the hand position-orientation vector r calculated by the forward kinematics calculation means 26 and the hand position-orientation correction desired vector $r_{dm}$ is found by a second operation unit 62.

The error $r_e$ found in the second operation unit 62 is inputted to position error compensation means 27 so that a position error compensating output $u_{rp}$ is found by the position error compensation means 27, and outputted to approximation inverse kinematics calculation means 28.

The approximation inverse kinematics calculation means 28 carries out approximation calculations of inverse kinematics by using the following approximation:

$$u_{out} = J_r(q)^{-1} u_{in} \quad \text{[Equation 5]}$$

wherein $J_r(q)$ is a Jacobian matrix that satisfies the following equation, $u_{in}$ is an input to the approximation inverse kinematics calculation means 28, and $u_{out}$ is an output from the approximation inverse kinematics calculation means 28.

[Equation 6]

$$\dot{r} = J_r(q)\dot{q}$$

In this case, the following approximations are taken into consideration:

[Equation 7]

$$q_e \approx \dot{q}, \; r_e \approx \dot{r}$$

Therefore, by substituting the following definition expression of Jacobian matrix with these, the following approximation [Expression 9] holds:

$$\dot{r} = J_r(q)\dot{q} \quad \text{[Equation 8]}$$

$$q_e \approx J_r(q)^{-1} r_e \quad \text{[Expression 9]}$$

In other words, by multiplying the error value relating to the hand position-orientation by $J_r(q)^{-1}$ in the approximation inverse kinematics calculation means 28, the error value relating to the hand position-orientation is transformed to an error value relating to the joint angle. Therefore, a position error compensating output $u_{re}$ corresponding to a value obtained by multiplying the hand position-orientation error $r_e$ by a gain or the like is inputted to the approximation inverse kinematics calculation means 28, a joint angle error compensating output $u_{q_e}$ for use in compensating the joint angle error $q_e$ is outputted from the approximation inverse kinematics calculation means 28 as its output.

The joint angle error compensating output $u_{q_e}$ is provided to a motor driver 18 as a voltage instruction value from the approximation inverse kinematics calculation means 28 through the D/A board 20, and the respective joint axes are driven to forwardly/reversely rotate so that the robot arm 5 is operated.

With respect to the basic structure of the impedance control means 4 constructed as described above, the following description will refer to a basic principle of operations.

The basic operation corresponds to a feed-back control (positional control) operation of the hand position-orientation error $r_e$ by the position error compensation means 27, and a portion surrounded by a dotted line in FIG. 2 forms a positional control system 29. For example, when a PID compensator is used as the position error compensation means 27, a controlling operation is exerted so that the hand position-orientation error $r_e$ is converged to 0; thus, it becomes possible to achieve a desired operation of the robot arm 5.

Upon executing an impedance control operation on the positional control system 29 as explained above, the hand position-orientation desired correction output $r_{dΔ}$ is added in the first operation unit 61 by the impedance calculation means 25 so that the hand position-orientation desired value is corrected. For this reason, in the positional control system 29, the hand position-orientation desired value is slightly deviated from the original value, with the result that mechanical impedance is achieved. A portion surrounded by a one-dot chain line in FIG. 2 forms a structure referred to as an impedance control system 49 on a positional control basis, and this impedance control system 49 achieves mechanical impedances of inertia M, viscosity D and rigidity K. The impedance control means 4 functions as one example of control means (control unit) (or operation control means, or an operation control unit).

Figure 3:
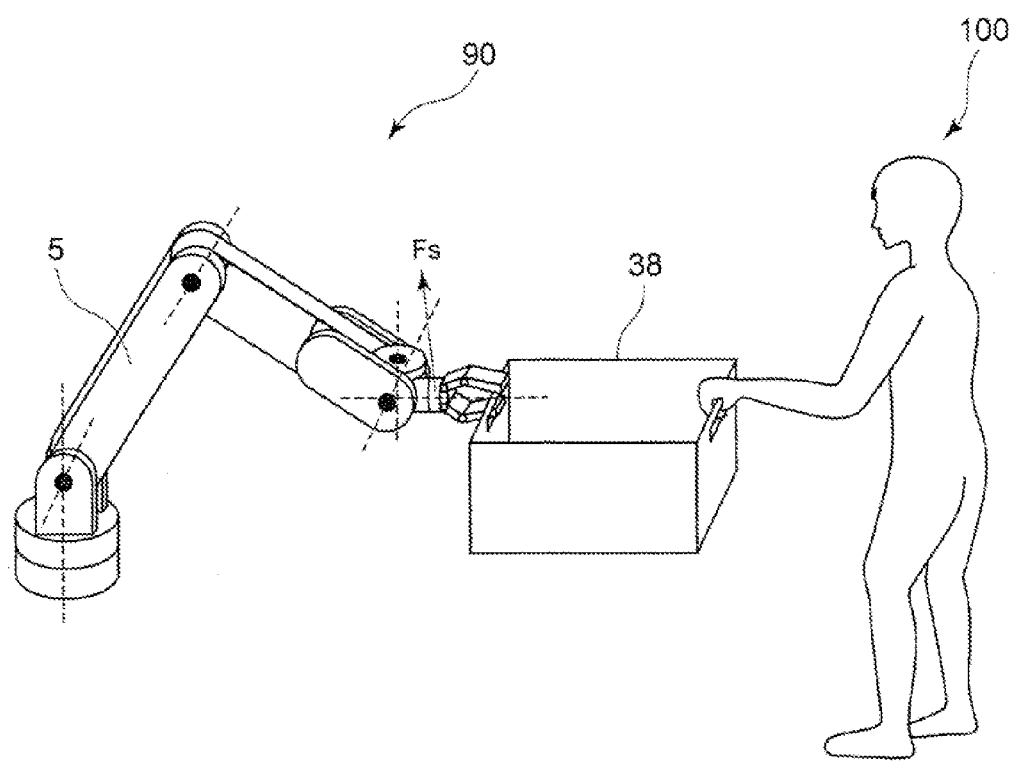
FIG. 3 is a view explaining a cooperative transporting job carried out by a person and the robot in accordance with the first embodiment of the present invention.

By utilizing the above-mentioned impedance control, a cooperative job, such as a coordinated transporting process of an object 38 between a person 100 and a robot 90, as shown in FIG. 3, can be achieved. When the person 100 applies a force to the object 38 in order to move the object 38, the force is transmitted to the robot arm 5 of the robot 90 through the object 38 so that the force is detected by a force sensor 3 of the robot arm 5 as an external force $F_s$. Since the external force F that becomes an input to the impedance control means 4 compensates for the gravitational force of the object 38 to be cooperatively transported, the gravitational force compensation means 30 carries out calculations by using equation (5) based on the external force $F_s$ detected by the force sensor 3, and the calculated F is used.

[Equation 10]

$$F = F_s - [0\ 0\ \tfrac{1}{2}mg\ 0\ 0\ 0]^T \qquad (5)$$

In this case, m represents a mass of the object 38, and g is a gravitational acceleration of the object 38. By carrying out an impedance control operation, with the external force F calculated from equation (5) serving as an input, the robot arm 5 is operated in a manner so as to follow the direction of the force applied by the person 100 so that a coordinated transporting process can be achieved. Here, the mass m of the object 38, and the gravitational acceleration g of the object 38 are preliminarily stored in the gravitational force compensation means 30.

In addition to the above-mentioned basic structure of the impedance control means 4, the features of the control device 1 for a robot of the first embodiment of the present invention lie in that joint movable-state calculation means 2 and force conversion means 24 are prepared, and the following description will refer to the joint movable-state calculation means 2 and the force conversion means 24 in detail.

When a current value (joint angle vector) q of a joint angle of the robot arm 5 is inputted, the joint movable-state calculation means 2 determines a movable state of each of joints 11, 12, 13, 14, 15, and 16 (more specifically, determines the fact that the respective joints or at least one joint of the first to sixth joints 11, 12, 13, 14, 15, and 16 are located at any point within a movable range, and calculates the movable state thereof), and outputs the results of determination (calculation results) to the force conversion means (force conversion unit, or external force conversion means, or external force conversion unit) 24.

Figure 4:
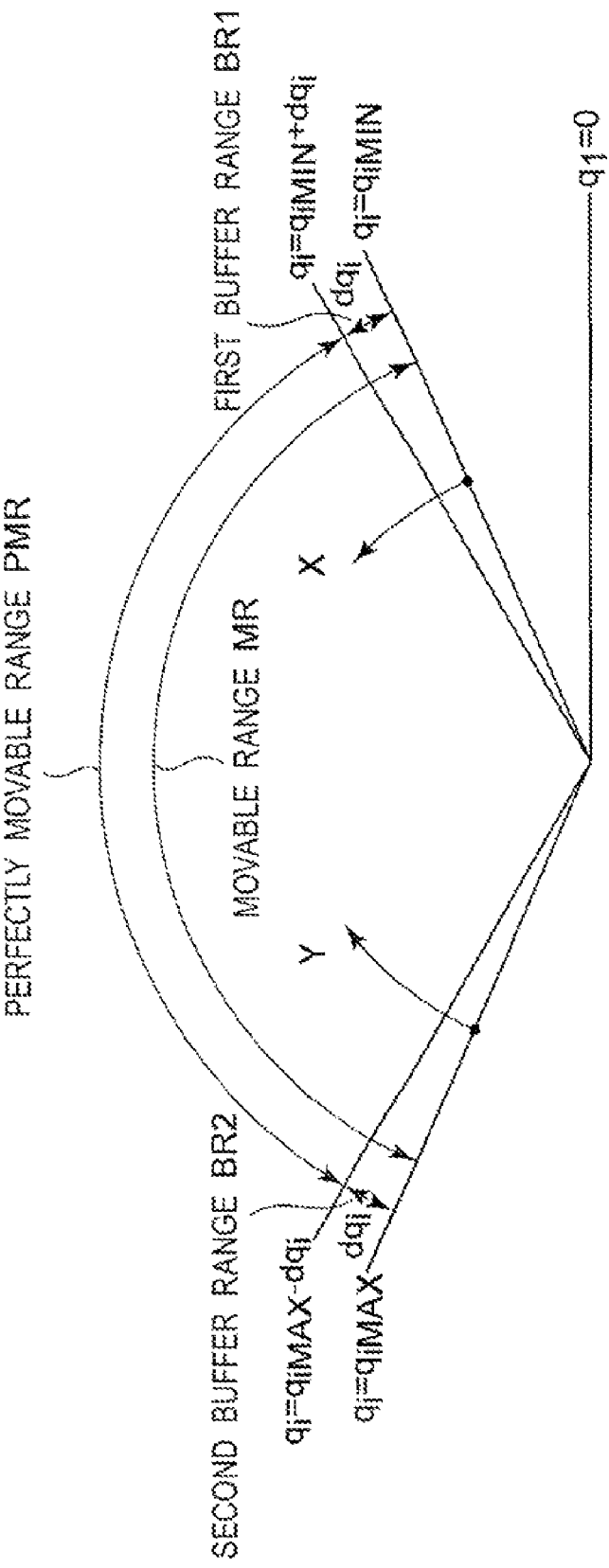
FIG. 4 is a view indicating a relationship between a joint angle $q_i$ and a movable state.

FIG. 4 is a view indicating the relationship between a joint angle $q_i$ (hereinafter, representing $i=1, 2, \ldots, 6$) and a movable state, and the leftward rotation on the drawing surface represents the rotation in the positive direction of a joint i. The joint movable-state calculation means 2 defines a movable range MR, and a first buffer range BR1 and a second buffer range BR2, each located a fixed distance inside the border line from each of the two ends of the movable range MR, by using a minimum value $q_{iMIN}$ and a maximum value $q_{iMAX}$ of the movable range of each of the joints 11, 12, 1, 14, 15, and 16, as well as a buffer range width $dq_i$. The first buffer range BR1 and the second buffer range BR2 respectively correspond to ranges in which the movable state of the joint is gradually changed. Moreover, the joint movable-state calculation means 2 divides the joint angle into patterns depending on the range to which the current joint angle $q_i$ belongs, so that the joint movable-state calculation means 2 calculates the movable state $L_i$ of each of the joints 11, 12, 13, 14, 15, and 16 as values within a range from 0 to 1.

Moreover, the impedance control means 4 is provided with external torque calculation means 50 that calculates an external torque τ that is generated in each of the joints by the external force F applied to the multi-joint robot arm 5. More specifically, the external torque calculation means 50 calculates a torque $\tau=[\tau_1, \tau_2, \tau_3, \tau_4, \tau_5, \tau_6]^T$ generated in each of the joints 11, 12, 13, 14, 15, and 16 by the external force F, based on equation (6). In the joint movable-state calculation means 2, in a case where, with each of the joints 11, 12, 13, 14, 15, and 16 being located within the buffer range BR1 or BR2, or outside the movable range, the torque τ calculated and found by the external torque calculation means 50 is determined by the joint movable-state calculation means 2 as being a torque in a direction that tries to return each of the joints to the inside of the movable range MR (in FIG. 4, in directions indicated by arrows X and Y, in the case of each of patterns B2, C2, and E2, which will be described later), a predetermined fixed offset value $dL_i$ is added to the movable state $L_i$ by the joint movable-state calculation means 2. Moreover, in the joint movable-state calculation means 2, in a case where, with each of the joints being located within the buffer range BR1 or BR2, or outside the movable range, the calculated and found torque τ is determined by the joint movable-state calculation means 2 as being not a torque in a direction that tries to return each of the joints to the inside of the movable range MR, the fixed offset value $dL_i$ is not added to the movable state $L_i$ by the joint movable-state calculation means 2.

[Equation 11]

$$\tau = J_v(q)^T F \qquad (6)$$

In the above equation (6), $J_v$ is a Jacobian matrix that satisfies the following equation:

[Equation 12]

$$v = J_v(q)\dot{q}$$

In the following equation,

[Equation 13]

$$v = [\dot{x}, \dot{y}, \dot{z}, \omega_x, \omega_y, \omega_z]$$

the following term indicates a rotating speed of the hand of the robot arm 5:

[Expression 14]

$$[\omega_x, \omega_y, \omega_z]$$

With respect to specific numeric values of the offset value $dL_i$, those values are preliminarily determined through experiments in which the robot arm 5 is actually operated, with easiness of manipulations or stability of control being taken into consideration, and the resulting values are stored in the joint movable-state calculation means 2.

As will be described later, the offset value $dL_i$ is a value that is obtained when the joint movable-state calculation means 2 determines the reaction of each joint i relative to the torque that tries to return the joint i toward the inside of the movable range MR, and serves as a value used for determining the degree of occurrence of a phenomenon such as a limit cycle that occurs on the border line of the movable range MR. More specifically, as the offset value $dL_i$ becomes greater, the reaction relative to the force that tries to return the joint to the movable range MR becomes better so that the manipulations become easier; in contrast, as the offset value $dL_i$ becomes greater, the manipulations become increasingly unstable due to the phenomenon such as the limit cycle. Therefore, specific numeric values of the offset value $dL_i$ are preliminarily determined through experiments in which the robot arm 5 is actually operated, with easiness of manipulations derived from a good reaction and stability of control that contradict to each other being taken into consideration, and the resulting values are stored in the joint movable-state calculation means 2.

In this case, the "easiness of manipulations" is explained as follows: As the offset value $dL_i$ becomes smaller, the operability becomes worse because a greater force is required to return the joint, and as the offset value $dL_i$ becomes greater, the operability becomes better because the joint is easily returned by using a small force. In contrast, as the offset value $dL_i$ becomes greater, the phenomenon such as the limit cycle occurs, more specifically, to cause vibrations, resulting in unstable controlling operations. That is, the "stability of control", mentioned here, refers to a possibility of occurrence of vibrations caused by a controlling operation, and subsequent instability in movements.

When describing the above descriptions in detail, the movable state $L_i$ of the joint i is more specifically divided into the following patterns, and calculated by the joint movable-state calculation means 2.

Pattern A: $(q_{iMIN}+d_{qi}) \leq q_i \leq (q_{iMAX}-d_{qi})$: That is, in the case (of the inside of the complete movable range PMR): $L_i=1$ holds.

Pattern B: $(q_{iMIN}) < q_i < (q_{iMIN}+d_{qi})$: That is in the case (of the inside of the first buffer range BR1):

Pattern B1: in the case of $\tau_i \leq 0$: $L_i=(q_i-q_{iMIN})/dq_i$ holds, and Pattern B2: in the case of $\tau_i > 0$: $L_i=(q_i-q_{iMIN})/dq_i+dL_i$ holds. (however, with limitation of $L_i \leq 1$)

Pattern C: $(q_{iMAX}-d_{qi}) < q_i < (q_{iMAX})$: That is, in the case (of the inside of the second buffer range BR2):

Pattern C1: in the case of $\tau i \geq 0$: $Li=(qiMAX-qi)/dqi$ holds, and

Pattern C2: in the case of $\tau i < 0$: $Li=(qiMAX-qi)/dqi+dLi$ holds. (however, with limitation of $Li \leq 1$)

Pattern D: $q_i \leq q_{iMIN}$: That is, in the case (of the outside of the movable range):

Pattern D1: in the case of $\tau i \leq 0$: $Li=0$ holds, and

Pattern D2: in the case of $\tau i > 0$: $Li=dLi$ holds

Pattern E: $q_{iMAX} \leq q_i$: That is, in the case (of the outside of the movable range):

Pattern E1: in the case of $\tau i \geq 0$: $Li=0$ holds, and

Pattern E2: in the case of $\tau i < 0$: $Li=dLi$ holds.

Based upon the movable state $L_i$ that is the output of the joint movable-state calculation means 2, upon application of the external force F onto the robot arm 5, the force conversion means 24 converts the external force F into a converted external force $F_h$ from which a direction component in which the robot arm 5 is made operable can be extracted.

The following two methods are proposed as the converting method for providing the converted external force $F_h$.

The first converting method is a method for carrying out the conversion based on the following equations (7) to (13).

[Equation 15]

$$F_h = \begin{pmatrix} f_h \\ n_h \end{pmatrix} \quad (7)$$

[Equation 16]

$$f_h = (1-L_3)\left\{f_{h2} - \frac{(j_1 \times j_2, f_{h2})}{(j_1 \times j_2, j_1 \times j_2)}(j_1 \times j_2)\right\} + L_3 f_{h2} \quad (8)$$

[Equation 17]

$$f_{h2} = (1-L_2)\left\{f_{h1} - \frac{(j_1 \times j_3, f_{h1})}{(j_1 \times j_3, j_1 \times j_3)}(j_1 \times j_3)\right\} + L_2 f_{h1} \quad (9)$$

[Equation 18]

$$f_{h1} = (1-L_1)\left\{f - \frac{(j_2 \times j_3, f)}{(j_2 \times j_3, j_2 \times j_3)}(j_2 \times j_3)\right\} + L_1 f \quad (10)$$

[Equation 19]

$$f = \begin{pmatrix} 1 & 0 & 0 & 0 & 0 & 0 \\ 0 & 1 & 0 & 0 & 0 & 0 \\ 0 & 0 & 1 & 0 & 0 & 0 \end{pmatrix} F \quad (11)$$

-continued

[Equation 20]

$$n_h = \begin{pmatrix} 0 & 0 & 0 & 1 & 0 & 0 \\ 0 & 0 & 0 & 0 & 1 & 0 \\ 0 & 0 & 0 & 0 & 0 & 1 \end{pmatrix} J_v(q)^{-T} \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & L_4 & 0 & 0 \\ 0 & 0 & 0 & 0 & L_5 & 0 \\ 0 & 0 & 0 & 0 & 0 & L_6 \end{pmatrix} J_v(q)^T F \quad (12)$$

In this case, $j_1$, $j_2$, and $j_3$ are three-dimensional vectors that satisfy equation (13), and 3×3 matrix $[j_1 \; j_2 \; j_3]$ corresponds to a partial matrix of 3×3 on the upper left of a Jacobian matrix $J_r(q)$ that satisfies the following relationship:

[Equation 21]

$$\dot{r} = J_r(q)\dot{q} \quad (13)$$

[Equation 22]

$$\begin{bmatrix} \dot{x} \\ \dot{y} \\ \dot{z} \end{bmatrix} = [j_1 \; j_2 \; j_3] \begin{bmatrix} \dot{q}_1 \\ \dot{q}_2 \\ \dot{q}_3 \end{bmatrix}$$

The second converting method relates to pattern classifications of movable states of each joint, and the method carries out the pattern classifications in accordance with patterns A to E.

Pattern α: In a case where all the joint angles $q_1$, $q_2$, and $q_3$ correspond to pattern A, the following equation holds:

[Equation 23]

$$f_h = f \quad (101)$$

Pattern β: In a case where any one of the joint angles q of the joint angles $q_1$, $q_2$, and $q_3$ corresponds to any one of patterns B to E (that is, the other two joint angles q of the joint angles $q_1$, $q_2$, and $q_3$ correspond to pattern A), for example, supposing that a joint angle $q_i$ corresponds to any one of patterns B to E, with the joint angles $q_a$ and $q_b$ corresponding to pattern A (in this case, however, $q_i$ represents any one of the joint angles $q_1$, $q_2$, and $q_3$, while $q_a$ and $q_b$ represent the other two joint angles of $q_1$, $q_2$, and $q_3$), the following equation holds.

[Equation 24]

$$f_h = (1-L_i)\left\{f - \frac{(j_a \times j_b, f)}{(j_a \times j_b, j_a \times j_b)}(j_a \times j_b)\right\} + L_i f \quad (102)$$

Pattern γ: In a case where any two of the joint angles q of the joint angles $q_1$, $q_2$, and $q_3$ corresponds to any of patterns B to E (that is, the rest one joint angle q of the joint angles $q_1$, $q_2$, and $q_3$ corresponds to pattern A), for example, supposing that a joint angle $q_i$ corresponds to pattern A, with the joint angles $q_a$ and $q_b$ corresponding to any of patterns B to E (in this case, however, $q_i$ represents any one of the joint angles $q_1$, $q_2$, and $q_3$, while $q_a$ and $q_b$ represent the other two joint angles of $q_1$, $q_2$, and $q_3$), the following equation holds.

[Equation 25]

$$f_h = (1 - L_a L_b)\frac{(j_i, f)}{(j_i, f)} j_i + L_a L_b f \quad (103)$$

Pattern δ: In a case where all the joint angles $q_1$, $q_2$, and $q_3$ correspond to any of patterns B to E, the following equation holds:

[Equation 26]

$$f_h = L_1 L_2 L_3 f \quad (104)$$

The other equations (7), (11), and (12) are the same as those of the first converting method.

The above-mentioned first converting method does not need pattern classifications of the conversion expressions, and is advantageous in that a simple algorithm can be used; however, this method is not applicable only to the case where an arm structure having parallel joint axes, such as the second joint 12 and the third joint 13 of the robot arm 5 shown in FIG. 1, is provided, with the joints of the parallel joint axes being simultaneously located completely out of the movable range.

In contrast, although the pattern classifications of the conversion expressions are required, the second converting method can be applied to any of the cases including the case in which a plurality of joints are located completely out of the movable range regardless of the arm structure.

Therefore, the force conversion means 24 is preferably designed preliminarily so as to select the first converting method and the second converting method depending on the arm structure, the size of the movable range of each of the joints, and the like.

Figure 5:
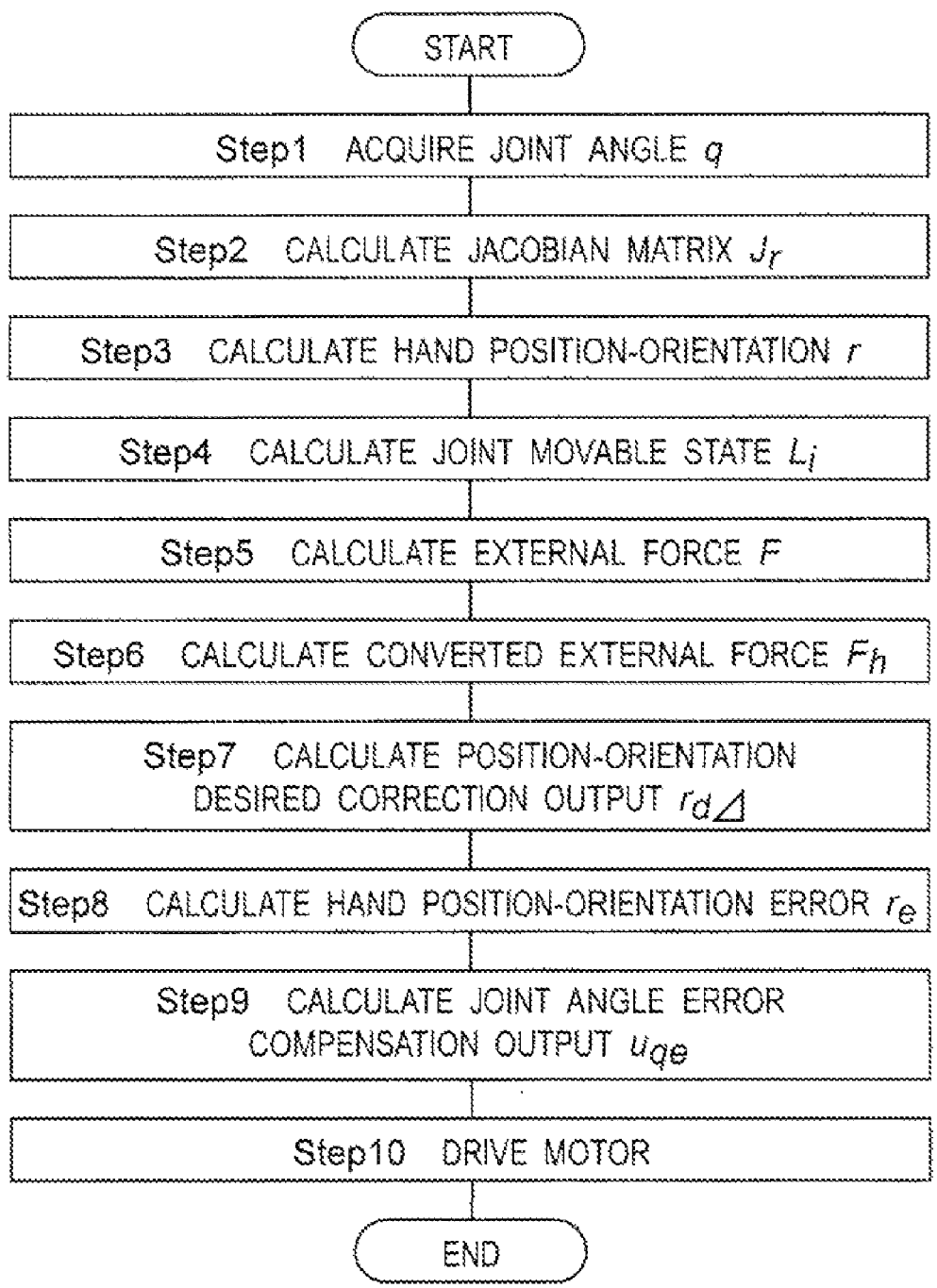
FIG. 5 is a flow chart representing entire operation steps of the impedance control means in the robot in accordance with the first embodiment of the present invention.

FIG. 5 shows a flow chart explaining operation steps to be used upon carrying out an impedance controlling operation by a control program based on the above-mentioned principle.

In step S1, joint angle data (joint angle vector q) measured by the encoder 42 is acquired in the control device 1.

In step S2, calculations, such as Jacobian matrix $J_r$ calculations required for kinematics calculations of the robot arm 5, are carried out by the approximation inverse kinematics calculation means 28.

In step S3, based on the joint angle data (joint angle vector q) from the robot arm 5, the current hand position-orientation vector r of the robot arm 5 is calculated by the forward kinematics calculation means 26 (processing in the forward kinematics calculation means 26).

In step S4, based on the joint angle data (joint angle vector q) from the robot arm 5, the joint movable-state calculation means 2 determines which pattern among patterns A to E should be used, and calculates a joint movable-state $L_i$.

In step S5, a measured value $F_s$ of the force sensor 3 is acquired by the gravitational force compensation means 30, and based on equation (5), an external force F is calculated by the gravitational force compensation means 30.

In step S6, in the force conversion means 24, based on equations (7) to (13) (first converting method) or equations (7), (11), (12), as well as equations (101) to (104) (second converting method), the external force F calculated in the gravitational force compensation means 30 is converted to a converted external force $F_h$.

In step S7, based on mechanical impedance parameters M, D, and K, the joint angle data (joint angle vector q), and the converted external force $F_h$ converted in the force conversion means 24, a hand position-orientation desired correction output $r_{dΔ}$ is calculated by the impedance calculation means 25 (processing in the impedance calculation means 25).

In step S8, an error $r_e$ of the hand position-orientation, that is, a difference between the hand position-orientation correction desired vector $r_{dm}$ corresponding to a sum of the hand position-orientation desired vector $r_d$ and the hand position-orientation desired correction output $r_{dΔ}$, found through calculations in the first operation unit 61, and the current hand position-orientation vector r, is calculated in the second operation unit 62 (processing in the position error compensation means 27). A PID compensator is proposed as a specific example of the position error compensation means 27. By appropriately adjusting three proportional, differential and integral gains corresponding to a diagonal matrix of a constant, controlling operations are exerted so that the position error is converged to 0.

In step S9, by multiplying the position error compensating output $U_{re}$ by an inverse matrix of the Jacobian matrix $J_r$ calculated in step S2, the position error compensating output $u_{re}$ is converted from a value relating to the hand position-orientation error to a joint angle error compensating output $U_{qe}$ relating to a joint angle error, by the approximation inverse kinematics calculation means 28 (processing in the approximation inverse kinematics calculation means 28).

In step S10, the joint angle error compensating output $u_{qe}$ is provided to the motor driver 18 from the approximation inverse kinematics calculation means 28 through the D/A board 20 so that, by changing the amount of current flowing through each of the motors 41, rotation movements of the joint axes of each of the joints of the robot arm 5 are generated.

By repeatedly executing the above-mentioned steps S1 to S10 as a controlling calculation loop, controlling processes of the operations of the robot arm 5 are achieved. Additionally, the order of the operations of steps S2 to S6 may be prepared as parallel processing operations, and the same order is not necessarily required.

The robot 90 in accordance with the first embodiment of the present invention is provided with the joint movable-state calculation means 2 and force conversion means 24 so that operations and effects as described later in detail can be obtained. The following description will refer to operations of the robot arm 90 when the robot arm 90 executes a cooperative transporting job together with a person 100, and the explanation is given centered on the third joint 13.

Figure 6:
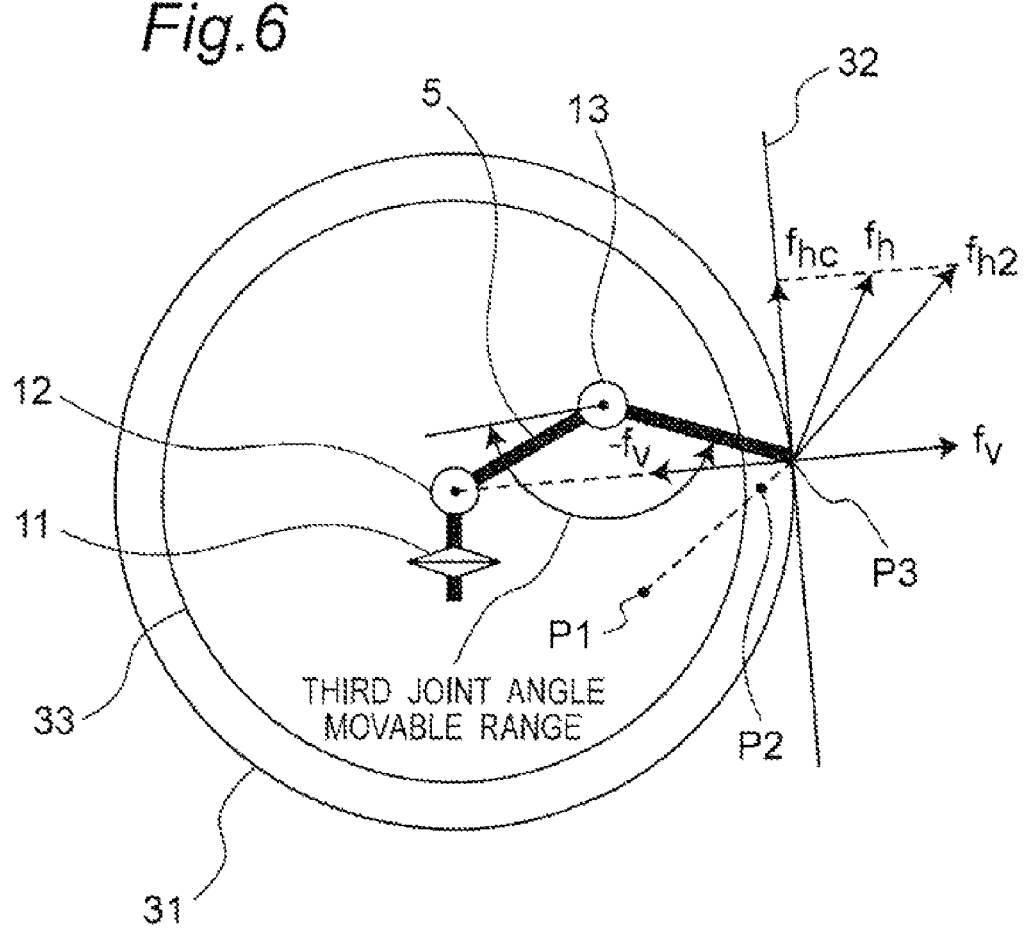
FIG. 6 is a view explaining a constraint curved surface and a force conversion in the robot in accordance with the first embodiment of the present invention.

FIG. 6 shows a relationship between translation external forces $f_h$ and $f_{h2}$ that appear in equation (8). FIG. 6 schematically illustrates first joint 11 to third joint 13 of the robot arm 5. A constraint curved surface 31 serves as a curved surface on which, when the third joint 13 moves beyond a movable range MR and is brought into a locked state so as not to further move, by allowing the other first and second joints 11 and 12 to move, the hand 6 of the tip unit of the robot arm 5 is allowed to move. Although the constraint curved surface 31 actually forms a spherical surface, FIG. 6 illustrates only the circle on its certain cross-sectional surface. That is, when the third joint 13 is brought into the locked state, the hand of the robot arm 5 is constrained by the constraint curved surface 31.

A plane that is made in contact with the constraint curved surface 31 and passes through the hand of the robot arm 5 is a tangential plane 32. Moreover, the tangential plane 32 is a plane that is in parallel with a plane including vectors $j_1$ and $j_2$.

An orthogonal projection of the translation external force $f_{h2}$ onto the tangential plane 32 is provided as $f_{hC}$. The orthogonal projection $f_{hC}$ corresponds to the translation external force $f_h$ when the movable state $L_3=0$ of the third joint 13 in equation (8), and is represented by equation (14). Additionally, equation (14) corresponds to a portion of equation (8) sandwiched by "{" and "}", and calculating the converted external force $F_h$ by using equation (8) is equivalent to using the conversion to the orthogonal projection. Moreover, not only equation (8), but also those portions sandwiched by "{" and "}" of equations (9) and (10), calculations thereof are also equivalent to using the conversion to the orthogonal projection. Furthermore, the orthogonal projection $f_{hC}$ is one example of the converted external force $F_h$. That is, when the orthogonal projection onto the tangential plane 32 of the constraint curved surface 31 is taken into consideration, a direction component in which the robot arm 5 is operable is formed.

[Equation 27]

$$f_{hC} = f_{h2} - \frac{(j_1 \times j_2, f_{h2})}{(j_1 \times j_2, j_1 \times j_2)}(j_1 \times j_2) \tag{14}$$

Moreover, the translation external force $f_h$ is an intermediate value, with its tip end located on a straight line (dotted line) that connects the tip end of the vector of the translation external force $f_{h2}$ and the tip end of the vector of the orthogonal projection $f_{hC}$ of the translation external force $f_{h2}$, and its position is defined by the movable state $L_3$ (when the movable state $L_3=0$, $f_h=f_{hC}$, and when the movable state $L_3=1$, $f_h=f_{h2}$).

In a case where the hand position of the third joint 13 is located at point P1 that exists inside of a buffer range border 33 within the perfectly movable range PMR, since this state corresponds to pattern A (movable state $L_3=1$), $f_h=f_{h2}$ holds so that the hand of the robot arm 5 is freely operated in a direction to which the force of the person is applied. In a limited case where the first joint 11 and the second joint 12 are also located within the perfectly movable range PMR, since $f_{h2}=f$ holds, the hand of the robot arm 5 is freely operated in a direction to which the force of the person is applied.

In a case where the hand is shifted beyond the buffer range border 33 to reach point P2 outside thereof, since this state corresponds to pattern C1, an impedance controlling process is carried out based on the translation external force $f_h$ that changes together with the change of the movable state $L_3$, with the result that the movement is gradually constrained.

In a case where the hand has reached point P3 on the constraint curved surface 31 that is the border of the movable range MR, since this state corresponds to pattern E1, an impedance controlling process is carried out, with the translation external force $f_{hC}$ serving as an input, so that the hand of the robot arm 5 moves along the constraint curved surface 31. That is, even in a case where a force having a component such as $f_v$ is applied from the person to the robot arm 5, since the force is cancelled upon conversion to the translation external force $f_h$ by equation (8), the hand of the robot arm 5 cannot be moved outside beyond the constraint curved surface 31 so that the angle of the third joint 13 does not exceed the movable range MR.

In contrast, in a case where a force having a component such as $-f_v$ is applied from the person to the robot arm 5 at point P3, since a movement returning to the inside of the movable range MR is exerted to the third joint 13, and since this state corresponds to pattern E2, the translation external force $f_h$ is exerted as a restoring force by the addition of the movable state $L_3=dL_3$ and the offset value so that a movement of the joint returning into the movable range MR can be obtained.

Moreover, in a case where a force having a component such as $-f_v$ is applied from the person to the robot arm 5 at point P2 in the same manner, since a movement returning to the inside of the perfectly movable range PMR from the buffer range BR1 is exerted to the third joint 13, and since this state corresponds to pattern C2, the translation external force $f_h$ is exerted as a restoring force by the addition of the movable state $L_3=(q_{3MAX}-q_3)/dL_3+dL_3$ and the offset value so that a movement of the joint returning into the perfectly movable range PMR can be obtained.

In the above-mentioned operation regulations, the buffer ranges BR1 and BR2 have a function to stabilize the operations by gradually constraining the operations. In a case where none of the buffer ranges BR1 and BR2 are installed, since the input to the impedance calculation means 25 is changed from the translation external force $f_{h2}$ to the translation external force $f_{hC}$ step by step when the hand arrives onto the constraint curved surface 31, the control system, that is, the impedance control means 4, tends to become unstable.

Moreover, upon receiving a force returning into the movable range MR, as in the case of pattern D2 or pattern E2, a phenomenon, such as a limit cycle, might occur around the constraint curved surface 31 to make the control system, that is, the impedance control means 4, further unstable. In contrast, by preparing the buffer ranges BR1 and BR2 so as to introduce the offset value $dL_j$, it becomes possible to carry out the constraining and restoring processes on the operations smoothly without causing the limit cycle.

Additionally, since pattern B (pattern B1, pattern B2) relates to the first buffer range BR1, and since this is the same as pattern C (pattern C1, pattern C2) relating to the second buffer range BR2 corresponding to the range on the opposite side to the first buffer range BR1 of pattern A, the explanation thereof will be omitted. Since pattern D (pattern D1, pattern D2) relates to the outside of the movable range of the first buffer range BR1, and since this is the same as pattern E (pattern E1, pattern E2) relating to the outside of the movable range of the second buffer range BR2 corresponding to the range on the opposite side to the first buffer range BR1 of pattern A, the explanation thereof will be omitted.

Although the above explanation has been given centered on the third joint 13, the same explanation is also given to the first joint 11 and the second joint 12, and in the case of the first converting method, by respectively carrying out conversions based on equations (9) and (10), while in the case of the second converting method, by carrying out conversions of pattern β, the operations of the robot arm 5 can be constrained in accordance with the movable range MR of each of the joints. In the case of the first converting method, by utilizing the series of equations (7) to (11), operation regulations can be simultaneously carried out on the first joint 11, the second joint 12, and the third joint 13, except for the case where joints of the parallel joint axes are simultaneously located outside the perfectly movable range.

In the case of the second converting method, by utilizing the pattern classifications of pattern α to pattern δ, it is possible to precisely deal with even a case in which a plurality of joints are simultaneously locked.

Figure 12:
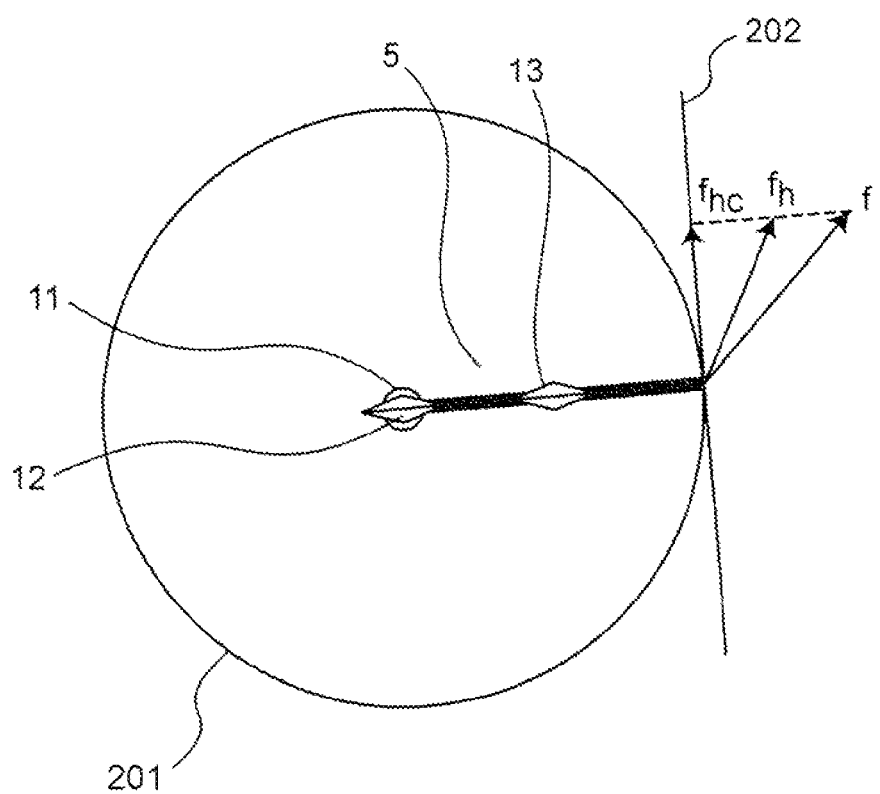
FIG. 12 is a view illustrating a relationship between translation external forces fh and f that appear in expression (103).

FIG. 12 shows a relationship between translation external forces $f_h$ and f that appear in equation (13). FIG. 12 schematically illustrates the first joint 11 to the third joint 13 of the robot arm 15. A constraint curved line 201 represents a curved line in which, in a case where the second joint 12 and third joint 13 proceed beyond the movable range MR and become no longer movable with being locked, the hand 6 of the tip unit of the robot arm 5 is allowed to move by allowing the remaining first joint 11 to move. That is, when the second joint 12 and the third joint 13 are locked, the hand of the robot arm 5 is constrained by the constraint curved line 201.

A straight line that is a tangent of the constraint curved line 201, and passes through the hand of the robot arm 5 is a tangent 202. Moreover, the tangent 202 is a straight line in parallel with a vector $j_1$.

An orthogonal projection of the translation external force f to the tangent 202 corresponds to $f_{hc}$. The orthogonal projection $f_{hc}$ represents a translation external force $f_h$ when the movable state $L_2=0$ in the second joint 12 and the movable state $L_3=0$ in the third joint 13 in equation (103), and is indicated by equation (105). Additionally, equation (105) corresponds to equation (103) when $L_2=0$, and calculating the converted external force $F_h$ by using equation (103) is equivalent to using the conversion to the orthogonal projection. That is, when the orthogonal projection onto the tangent 202 of the constraint curved line 201 is taken into consideration, a directional component in which the robot arm 5 is operable can be obtained.

[Equation 28]

$$f_{hc} = \frac{(j_i, f)}{(j_i, f)} j_i \quad (105)$$

Moreover, the translation external force $f_h$ is an intermediate value, with its tip end located on a straight line (dotted line) that connects the tip end of the vector of the translation external force f and the tip end of the vector of the orthogonal projection $f_{hC}$ of the translation external force f, and its position is defined by the movable state $L_2L_3$ (when the movable state $L_2L_3=0$, $f_h=f_{hC}$, and when the movable state $L_3=1$, $f_h=f_2$).

In accordance with the conversion based on equation (105) as described above, it is possible to deal with even operations in which the two joints that are the second joint 12 and the third joint 13 are locked.

With respect to the fourth joint 14, the fifth joint 15, and the sixth joint 16 that determine the orientation ($\phi$, $\theta$, $\psi$) of the robot arm 5, the operation regulations of the respective joints are achieved based on equation (12). In equation (12), the portion of $J_v(q)^T F$ is the same as the right side of equation (6), and corresponds to torque $\tau=[\tau_1, \tau_2, \tau_3, \tau_4, \tau_5, \tau_6]^T$ generated in the respective joints 11, 12, 13, 14, 15, and 16 by an external force F. A vector $[\tau_1, \tau_2, \tau_3, L_4\tau_4, L_5\tau_5, L_6\tau_6]^T$, prepared by respectively multiplying the third, fourth, and fifth lines of this torque vector by joint movable-states $L_4$, $L_5$, and $L_6$ of the fourth joint 14, the fifth joint 15, and the sixth joint 16, is applied to an equation $J_v(q)^{-T}$ so as to be inverse-transformed into a hand external force, and $n_h$ is obtained by extracting only the moment components. Therefore, for example, supposing that $L_4=0$, $\tau_4=0$ holds; therefore, when an impedance controlling process is carried out with the moment component $n_h$ serving as an input, the fourth joint 14 is not operated and fixed.

With respect to the fifth joint 15 and the sixth joint 16, the same processes can be carried out, and with the above-mentioned principle, the operation regulations of the fourth joint 14, the fifth joint 15, and the sixth joint 16 forming a wrist portion 7 that determines the orientation ($\phi$, $\theta$, $\psi$) of the hand of the robot arm 5, are achieved based on the joint movable-states $L_4$, $L_5$, and $L_6$.

As described above, in accordance with the first embodiment, the joint movable-state calculation means 2 and the force conversion means 24 are prepared; therefore, even in a case where a person carries out such a manipulation as to exceed the movable range MR of a joint of the robot arm 5 upon operation under an impedance controlling process, the movable state of the joint is determined by the joint movable-state calculation means 2, and a converted external force $F_h$ converted by the force conversion means 24 is used as an input to the impedance calculation means 25 so that operation regulations of the robot arm 5 are achieved, thereby making it possible to prevent each of the joints from exceeding the movable range MR.

Moreover, in accordance with the first embodiment, the operation regulations are carried out by converting the input to the impedance calculation means 25 by using the force conversion means 24, that is, the operation regulations are carried out by limiting the input from the external force F to the converted external force $F_h$; therefore, even in such a state-in which the robot arm 5 proceeds beyond the mechanical movable range MR with the result that the robot arm 5 becomes no longer movable, the input is prevented from being kept entering the impedance calculation means 25 to cause accumulated errors in the impedance calculation means 25 or the position control system 29 placed as the succeeding step, thereby making it possible to obtain a special effect that a stable control system can be achieved.

A structure may be proposed (as a conventional art) in which, without using the force conversion means 24, operation regulations of joints are carried out in the position controlling system 29; however, in this case, countermeasures against accumulated errors need to be prepared in the impedance calculation means 25 or the position controlling system 29 placed as the succeeding step, and this makes the control system structure further complicated. In contrast, in the first embodiment using the force conversion means 24, no countermeasures against accumulated errors are required so that a simple control system structure can be used.

Furthermore, since the first embodiment does not use a system in which operation regulations are carried out by changing impedance parameters for impedance control, no device for making the parameters variable is required so that the structure of a control system can be simplified, and it is possible to prevent the control system from becoming unstable due to the parameter changes. In other words, in the first embodiment, by carrying out input regulations by using the force conversion means 24 (in other words, by using the converted external force $F_h$ converted by the force conversion means 24 from an external force F as an input to the impedance calculation means 25), the above-mentioned superior effect can be exerted so that no changes in impedance parameters are required.

In accordance with the present first embodiment, the operation regulations of the respective joints can be carried out independently; therefore, even if one of the joints is operation-regulated, the other operable joints are allowed to keep moving without operation regulations so that it is possible to provide a robot having good operability that is not immediately operation-regulated and stopped.

(Second Embodiment)

A basic structure of a robot in accordance with a second embodiment of the present invention is the same as that of the first embodiment shown in FIGS. 1 and 2; therefore, explanations on the common portions are omitted, and the following description will refer to only different points in detail.

Figure 7:
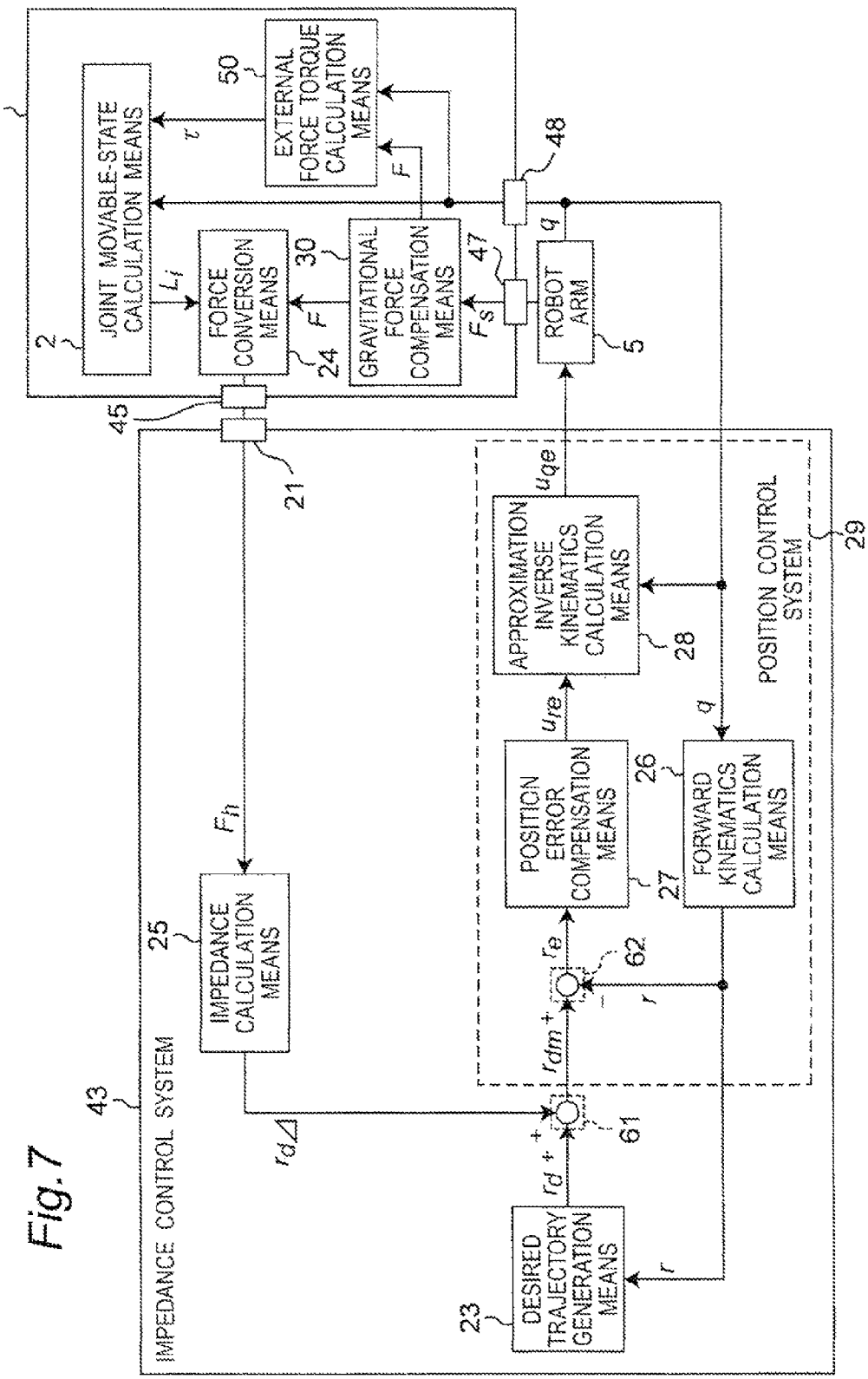
FIG. 7 is a block diagram illustrating a structure of an impedance control means of a robot in accordance with a second embodiment of the present invention.

As shown in FIG. 7, in the second embodiment, force input control means 34 that is independent from normal impedance control means 43 (that is, the impedance calculation means 25, the desired trajectory generation means 23, the forward kinematics calculation means 26, the position error compensation means 27, the approximation inverse kinematics calculation means 28, the first operation unit 61, and the second operation unit 62) is provided with joint movable-state calculation means 2 and force conversion means 24 so that this structure is allowed to communicate with an existing control device (first control device) 1B.

Figure 8:
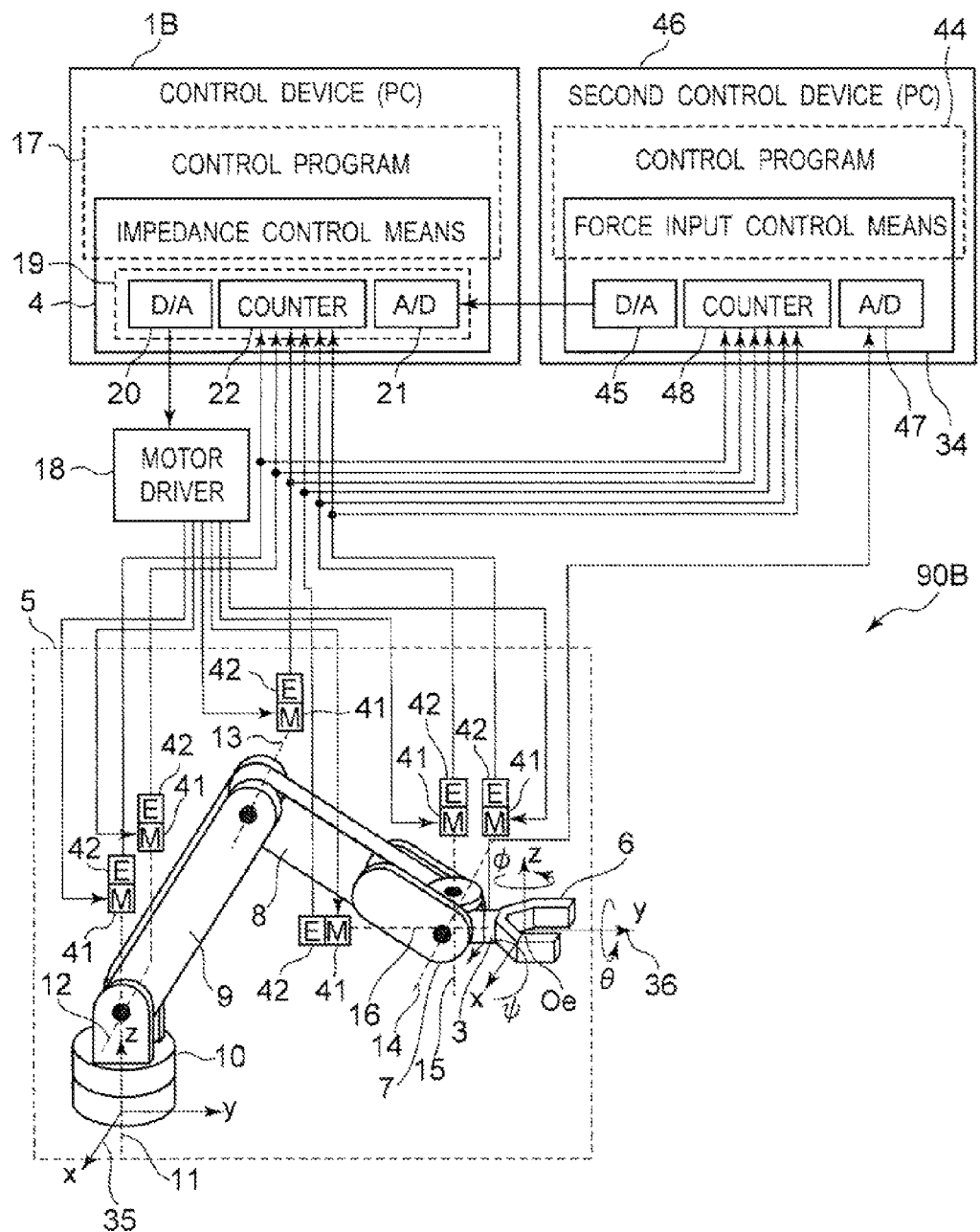
FIG. 8 is a view illustrating the entire structure of the robot of the second embodiment of the present invention.

FIG. 8 illustrates the entire structure of a robot 90B in accordance with the second embodiment in which a specific structure of a control device is shown. In the control device of the second embodiment, a second control device 46 is added separately from a first control device 1B, and two independent control devices 1B and 46 are prepared.

The second control device 46 is constituted by a general-use personal computer as its hardware. Moreover, portions except for an input/output IF (a D/A board 45, an A/D board 47, and a counter board 48) achieve force input control means 34 by using a control program 44 that is executed by the personal computer. The force input control means 34 is provided to which an external force $F_s$ is inputted by a force sensor 3 through the A/D board 47, and from which a converted external force $F_h$ serving as a conversion result by the force conversion means 24 is outputted to the A/D board 21 forming an force sensor input of the first control device 1B through the D/A board 45, and acquired by the first control device 1B through the A/D board 21. In this manner, by connecting the D/A board 45 and the A/D board 21 with each other, communication means through which the converted external force $F_h$ is transmitted by a voltage value is composed.

Moreover, the force input control means 34 acquires pieces of joint angle information outputted from the encoders 42 of the respective joint portions of the robot arm 5 through the counter board 48, and the information is used by the joint movable-state calculation means 2 for determining movable states of the joints 11, 12, 13, 14, 15, and 16.

Since the second embodiment has a structure in which the force input control means 34 is separately added to the normally used impedance control means 43, two separately independent structures, as shown in FIG. 7, are easily realized. Therefore, although, in the first embodiment, the impedance control means 4 is realized by a control program 17 that is operated on a single control device (PC) 1, as shown in FIG. 1, in the second embodiment, the second control device 46 is added to the first control device 1B, as shown in FIG. 8, so that this structure is allowed to communicate with the existing first control device 1B.

With this structure, for example, by adding only the second control device 46 for processing an input signal from a force sensor of a commercially available robot control device thereto, operation regulations of the robot arm 5 can be achieved.

(Third Embodiment)

A basic structure of a control device in accordance with a third embodiment of the present invention is the same as that of the first embodiment shown in FIGS. 1 and 2; therefore, explanations on the common portions are omitted, and the following description will refer to only different points in detail.

Figure 9:
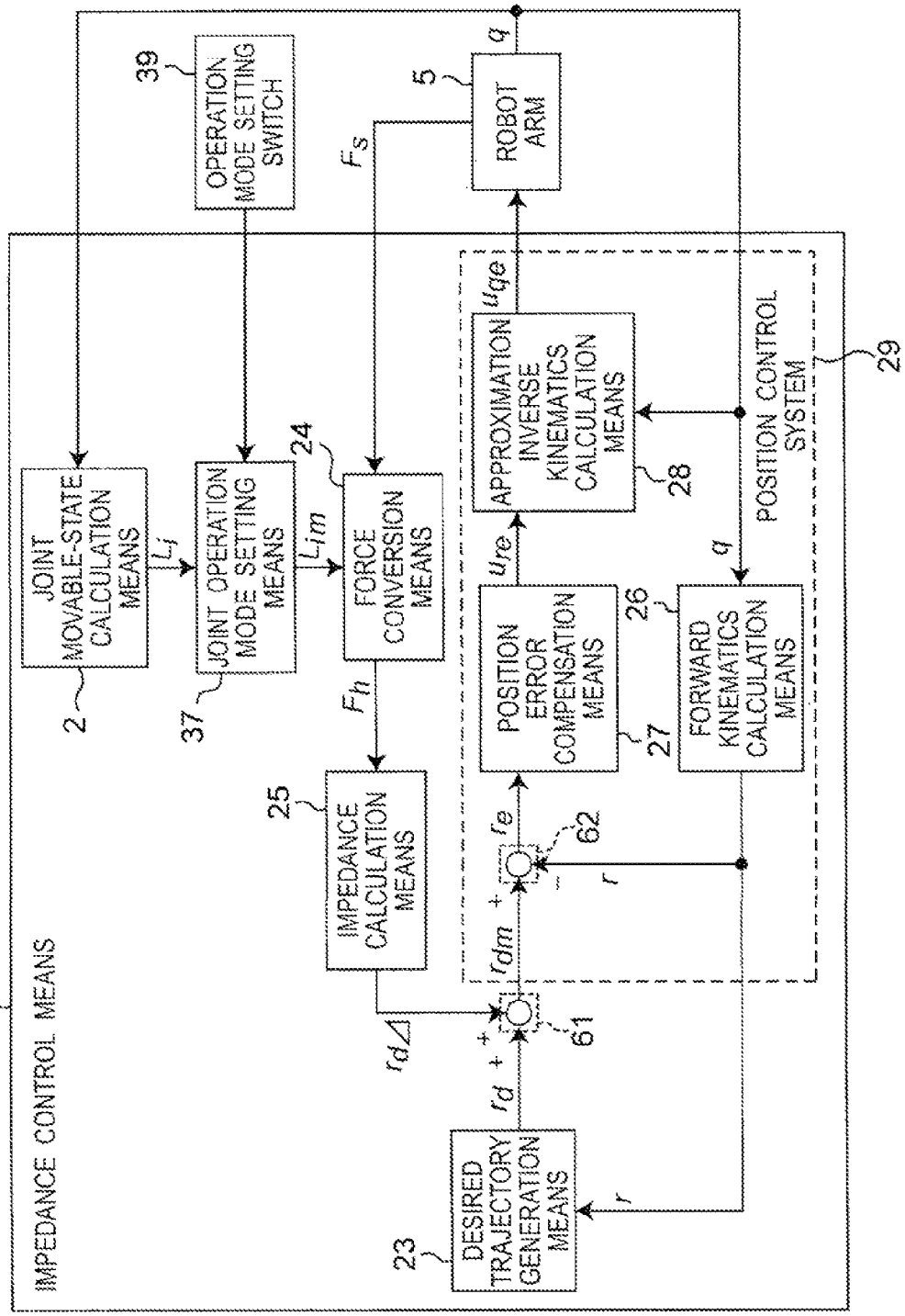
FIG. 9 is a block diagram illustrating a structure of an impedance control means of a robot in accordance with a third embodiment of the present invention.
Figure 10:
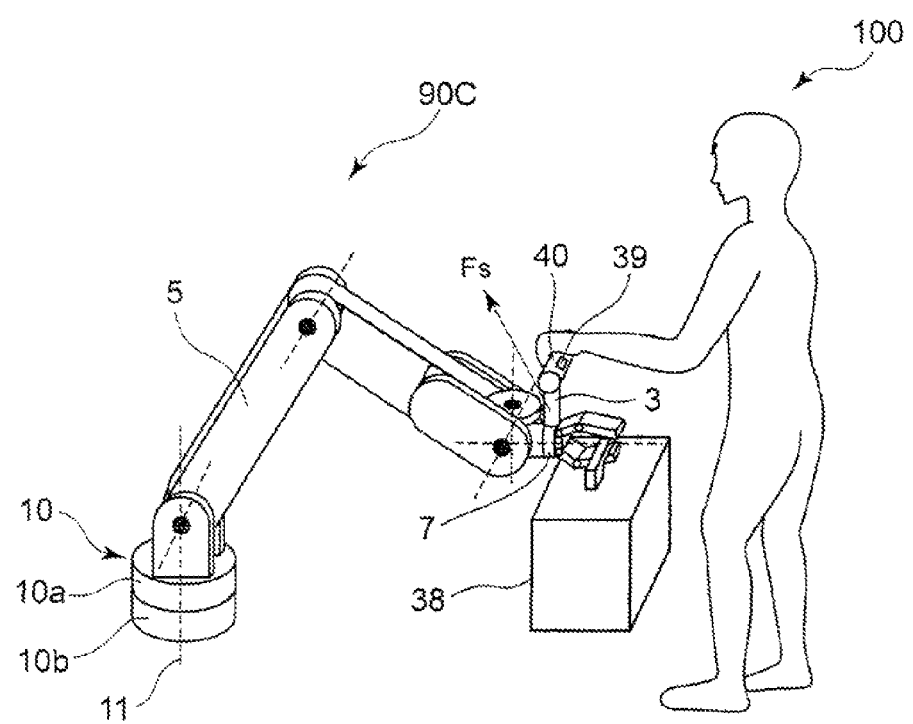
FIG. 10 is a view explaining a cooperative transporting job carried out by a person and the robot in accordance with the third embodiment of the present invention.

FIG. 9 is a block diagram illustrating a structure of impedance control means of a robot 90C in accordance with the third embodiment of the present invention, and FIG. 10 is a view explaining a cooperative transporting job between the robot 90C and a person 100.

As shown in FIG. 10, in the robot 90C of the third embodiment, an operation handle 40 is secured to a wrist portion 7 with a force sensor 3 interposed therebetween, and the person 100 directly grabs the operation handle 40, and applies a force thereto so as to operate the robot 90C. The force sensor 3 is placed between the operation handle 40 and the robot arm 5 so that the force applied by the person 100 upon operation can be detected by the force sensor 3.

Moreover, an operation mode setting switch 39 serving as one example of an operation mode setting unit is attached to the operation handle 40, and the person 100 can set and switch operation modes (movable or fixed modes) by operating the operation mode setting switch 39 functioning as one example of an operation mode input unit.

As shown in FIG. 9, an operation mode instruction is inputted to joint operation mode setting means 37 from the operation mode setting switch 39. Moreover, a joint movable state $L_i$ is inputted from the joint movable-state calculation means 2 to the joint operation mode setting means 37, with an expansion joint movable state $L_{im}$ being outputted to the force conversion means 24.

In the case of the cooperative job mode between the person 100 and the robot 90C as shown in FIG. 10, since robot arm 5 receives all the load of an object 38, no gravitational force compensation means 30 is required. In this case, a measured value $F_s$ of the force sensor 3 is inputted to the force conversion means 24 as an external force F, and changed to a converted external force $F_h$.

The operation mode setting switch 39 can carry out movable or fixed mode settings on the respective six joints 11, 12, 13, 14, 15, and 16 of the robot arm 5.

The joint operation mode setting means 37 installed in the impedance control means 4 outputs a movable state $L_i$, as it is, as its expansion joint movable state $L_{im}$, in the case of the movable mode setting, while, in the case of the fixed mode setting, the joint operation mode setting means 37 outputs an expansion joint movable state $L_{im}=0$, in response to the movable or fixed mode setting of each of the joints set in the operation mode setting switch 39. These expansion joint movable states $L_{im}$ are dealt in the same manner as in the movable state $I_i$ explained in the first embodiment, and inputted to the conversion means 24 to be used therein. Thus, the joint set in the fixed mode is fixed, with its operations being regulated based on the principle as explained in the first embodiment.

As described above, in accordance with the present third embodiment, the joint operation mode setting means 37 is provided so that an operation with a specific joint being fixed or an operation with only the specific joint being allowed to rotate can be easily carried out, thereby making it possible to provide a robot having superior operability.

Figure 11:
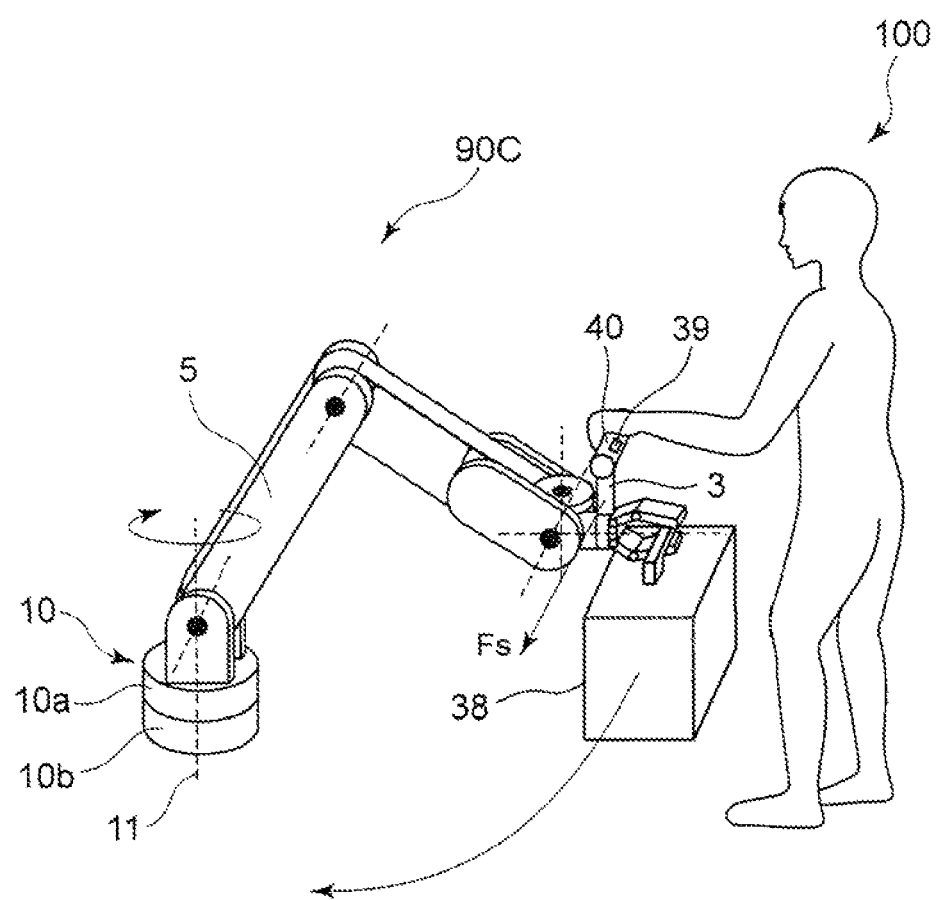
FIG. 11 is a view indicating a specific example of an operation of the robot in accordance with the third embodiment of the present invention.

As shown in FIG. 11, there is proposed a specific example of operations of the robot in accordance with the third embodiment in which, upon carrying out such an operation as to rotate only the first joint 11 with the robot arm 5 being pivoted relative to a base unit 10, the first joint 11 is set to be movable by the operation mode setting switch 39 with the second to sixth joints 12 to 16 being fixed, so that it is possible to achieve a pivotal operation with only the first joint 11 of the robot arm 5 being easily rotated, simply by allowing the person to apply a force onto the operation handle 40.

By properly combining the arbitrary embodiments of the aforementioned various embodiments, the effects possessed by the embodiments can be produced.

INDUSTRIAL APPLICABILITY

The robot, the control device and control method for a robot of the present invention make it possible to achieve operation regulations of a robot arm in accordance with operating states of each joint, such as a regulation of the operation range of the joint of the robot arm by using a simple control-system structure, so that it becomes possible to reduce instability of the control system and also to provide an effective robot that can carry out a cooperative job with a person, such a robot as to carry out a job assist, such as a power assist in factories, household, or a nursing care field, as well as a control device and a control method for a robot.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot comprising:
a multi-joint robot arm;
an external force detection unit that is installed in the multi-joint robot arm, and detects an external force;
a joint movable-state calculation unit that (i) calculates a movable state of a joint of the multi-joint robot arm, the joint being located at any position within a movable range, and (ii) determines whether or not the external force is a force applied to the multi-joint robot arm that tries to move the joint in a direction from inside the movable range to outside the movable range;
an external force conversion unit which, based on the movable state of the joint calculated by the joint movable-state calculation unit, converts the external force detected by the external force detection unit to a converted external force; and
a control unit that controls the multi-joint robot arm so as to be operation-regulated in accordance with the movable state of the joint of the multi-joint robot arm by carrying out impedance control using the converted external force when the joint movable-state calculation unit determines that the external force is the force applied to the multi-joint robot arm that tries to move the joint in the direction from inside the movable range to outside the movable range,
wherein the external force conversion unit converts the external force detected by the external force detection unit to the converted external force such that the converted external force is an orthogonal projection onto a tangential plane of a constraint curved surface in which a hand of the multi-joint robot arm is allowed to move when the joint of the multi-joint robot arm is fixed.

2. The robot in accordance with claim 1, further comprising:
an external force torque calculation unit that calculates an external force torque that is generated in each of a plurality of joints of the multi-joint robot arm by the external force applied to the multi-joint robot arm,
wherein based on results of calculations of the external torque calculation unit, the joint movable-state calculation unit determines whether or not the external force torque corresponds to a force that tries to return an action of each of the plurality of joints to an inside of the movable range from an outside of the movable range,
wherein when the joint movable-state calculation unit determines that the external force torque corresponds to the force that tries to return the action of each joint of the multi-joint robot arm to the inside of the movable range from the outside of the movable range, the control unit refrains from regulating the operation of the multi-joint robot arm by carrying out the impedance control, and wherein when the joint movable-state calculation unit determines that the external force torque does not correspond to the force that tries to return the action of each of the plurality of joints to the inside of the movable range from the outside of the movable range, the control unit regulates the operation of the multi-joint robot arm by carrying out the impedance control.

3. The robot in accordance with claim 1,
wherein, by converting the external force to a joint torque, the joint movable-state calculation unit determines whether or not the converted external force converted to the joint torque corresponds to a force that tries to return an action of each of a plurality of joints of the multi-joint robot arm to an inside of the movable range from an outside of the movable range,
wherein when the joint movable-state calculation unit determines that the converted external force converted to the joint torque corresponds to the force that tries to return the action of each of the plurality of joints of the multi-joint robot arm to the inside of the movable range from the outside of the movable range, the control unit refrains from regulating the operation of the multi-joint robot arm by carrying out the impedance control, and
wherein when the joint movable-state calculation unit determines that the converted external force converted to the joint torque does not correspond to the force that tries to return the action of each of the plurality of joints of the multi-joint robot arm to the inside of the movable range from the outside of the movable range, the control unit regulates the operation of the multi-joint robot arm by carrying out the impedance control.

4. The robot in accordance with claim 1, further comprising:
an operation mode setting unit that sets a movable or fixed operation mode for the joint of the multi-joint robot arm; and
a joint operation mode setting unit which, upon receipt of an indication of the operation mode set for the joint by the operation mode setting unit, calculates an operation movable state of the joint based on (i) the operation mode set for the joint and (ii) the movable state of the joint calculated by the joint movable-state calculation unit,
wherein the external force conversion unit converts the external force detected by the external force detection unit to the converted external force based on the operation movable state of the joint calculated by the joint operation mode setting unit such that the control unit carries out the impedance control based on the converted external force in accordance with the operation movable state of the joint of the multi-joint robot arm.

5. The robot in accordance with claim 1,
wherein the joint movable-state calculation unit prepares buffer ranges, each located a fixed distance inside a border line of each of two ends of the movable range of the joint, and in the respective buffer ranges, gradually changes the movable state of the joint.

6. The robot in accordance with claim 1,
wherein buffer ranges, each located inside each of two ends of a movable range of the joint of the multi-joint robot arm, a perfectly movable range PMR corresponding to a rest of the movable range from which the buffer ranges are excluded, and a range outside the movable range are prepared in a divided manner, and wherein the joint movable-state calculation unit calculates values of the movable state of the joint so as to be different from one another depending on the respective ranges.

7. The robot in accordance with claim 1,
wherein the joint movable-state calculation unit and the force conversion unit are prepared separately from the control unit of the multi-joint robot arm as a second control unit, and
wherein the external force converted by the force conversion unit is inputted to the control unit by the second control unit through communication.

8. A control device for a robot having a multi-joint robot arm, the control device comprising:
a joint movable-state calculation unit that calculates a movable state of a joint of the multi-joint robot arm, the joint being located at any position within a movable range, and (ii) determines whether or not an external force is a force applied to the multi-joint robot arm that tries to move the joint in a direction from inside the movable range to outside the movable range, the external force being detected by an external force detection unit that is installed in the multi-joint robot arm;
an external force conversion unit which, based on the movable state of the joint calculated by the joint movable-state calculation unit, converts the external force detected by the external force detection unit to a converted external force; and
a control unit that controls the multi-joint robot arm so as to be operation-regulated in accordance with the movable state of the joint of the multi-joint robot arm by carrying out impedance control using the converted external force when the joint movable-state calculation unit determines that the external force is the force applied to the multi-joint robot arm that tries to move the joint in the direction from inside the movable range to outside the movable range,
wherein the external force conversion unit converts the external force detected by the external force detection unit to the converted external force such that the converted external force is an orthogonal projection onto a tangential plane of the constraint curved surface in which a hand of the multi-joint robot arm is allowed to move when the joint of the multi-joint robot arm is fixed.

9. A control method for a robot having a multi-joint robot arm, the control method comprising:
calculating, using a joint movable-state calculation unit, a movable state of a joint of the multi-joint robot arm, the joint being located at any position within a movable range;
determining, using the joint movable-state calculation unit, whether or not an external force is a force applied to the multi-joint robot arm that tries to move the joint in a direction from inside the movable range to outside the movable range, the external force being detected by an external force detection unit that is installed in the multi-joint robot arm;
converting, based on the calculated movable state of the joint, the external force detected by the external force detection unit to a converted external force, the converting being performed by an external force conversion unit;
controlling, using a control unit, the multi-joint robot arm so as to be operation-regulated in accordance with the movable state of the joint of the multi-joint robot arm by carrying out impedance control using the converted external force when it is determined that the external force is the force applied to the multi-joint robot arm that tries to move the joint in the direction from inside the movable range to outside the movable range,
wherein the external force conversion unit converts the external force detected by the external force detection unit to the converted external force such that the converted external force is an orthogonal projection onto a tangential plane of the constraint curved surface in which a hand of the multi-joint robot arm is allowed to move when the joint of the multi-joint robot arm is fixed.

10. A non-transitory computer readable recording medium having stored thereon a control program for a robot having a multi-joint robot arm, wherein, when executed by a computer, the control program allows the computer to function as a control device comprising:
a joint movable-state calculation unit that (i) calculates a movable state of a joint of the multi-joint robot arm, the joint being located at any position within a movable range, and (ii) determines whether or not an external force is a force applied to the multi-joint robot arm that tries to move the joint in a direction from inside the movable range to outside the movable range, the external force being detected by an external force detection unit that is installed in the multi-joint robot arm;
an external force conversion unit which, based on the movable state of the joint calculated by the joint movable-state calculation unit, converts the external force detected by the external force detection unit to a converted external force; and
a control unit that controls the multi-joint robot arm so as to be operation-regulated in accordance with the movable state of the joint of the multi-joint robot arm by carrying out impedance control using the converted external force when the joint movable-state calculation unit determines that the external force is the force applied to the multi-joint robot arm that tries to move the joint in the direction from inside the movable range to outside the movable range,
wherein the external force conversion unit converts the external force detected by the external force detection unit to the converted external force such that the converted external force is an orthogonal projection onto a tangential plane of the constraint curved surface in which a hand of the multi-joint robot arm is allowed to move when the joint of the multi-joint robot arm is fixed.

11. A robot comprising:
a multi-joint robot arm;
an external force detection unit that is installed in the multi-joint robot arm, and detects an external force;
a joint movable-state calculation unit that calculates a movable state of a joint of the multi-joint robot arm, the joint being located at any position within a movable range or outside the movable range;
an external force conversion unit which, based on the movable state of the joint calculated by the joint movable-state calculation unit, converts the external force detected by the external force detection unit to a converted external force; and
a control unit that controls the multi-joint robot arm so as to be operation-regulated in accordance with the movable state of the joint of the multi-joint robot arm by carrying out impedance control using the converted external force when the movable state of the joint calculated by the joint movable-state calculation unit indicates that (i) the position of the joint is located in a buffer range located inside the movable range or the position of the joint is located outside of the movable range and (ii) a torque generated by the external force has a direction from inside the movable range to outside the movable range, wherein the external force conversion unit converts the external force detected by the external force detection unit to the converted external force such that the converted external force is an orthogonal projection onto a tangential plane of a constraint curved surface in which a hand of the multi-joint robot arm is allowed to move when the joint of the multi-joint robot art is fixed.

* * * * *